(12) United States Patent
Ketels et al.

(10) Patent No.: US 10,427,554 B2
(45) Date of Patent: Oct. 1, 2019

(54) OCCUPANT SUPPORT

(71) Applicant: Faurecia Automotive Seating, LLC, Auburn Hills, MI (US)

(72) Inventors: Cedric Ketels, Holland, MI (US); Rod Goodrich, Watervliet, MI (US); John M. Perraut, Rochester Hill, MI (US); Tristan J. Vanfossen, Belmont, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 25 days.

(21) Appl. No.: 15/812,096

(22) Filed: Nov. 14, 2017

(65) Prior Publication Data

US 2018/0134181 A1 May 17, 2018

Related U.S. Application Data

(60) Provisional application No. 62/422,215, filed on Nov. 15, 2016.

(51) Int. Cl.
*B60N 2/02* (2006.01)
*A61F 5/00* (2006.01)
*A47C 7/46* (2006.01)
*A47C 7/18* (2006.01)
*B60N 2/66* (2006.01)
(Continued)

(52) U.S. Cl.
CPC .......... *B60N 2/0252* (2013.01); *B60N 2/002* (2013.01); *B60N 2/0232* (2013.01); *B60N 2/0296* (2013.01); *B60N 2/1839* (2013.01); *B60N 2/1864* (2013.01); *B60N 2/22* (2013.01); *B60N 2/2222* (2013.01); *B60N 2/643* (2013.01); *B60N 2/646* (2013.01); *B60N 2/665* (2015.04); *B60N 2/914* (2018.02); *B60N 2002/0216* (2013.01);
(Continued)

(58) Field of Classification Search
CPC .... B60N 2/02; A61F 5/00; A47C 7/46; A47C 7/18
See application file for complete search history.

(56) References Cited

U.S. PATENT DOCUMENTS 2,016,325 A 10/1935 Geer
3,331,089 A * 7/1967 Ornas, Jr. ............... A47C 7/18
297/452.46

(Continued)

FOREIGN PATENT DOCUMENTS

DE 19811959 A1 9/1999
EP 2666663 11/2013
(Continued)

OTHER PUBLICATIONS

Multiple Sclerosis Trust, "Understanding and Improving Your Posture," Jul. 2012, available from https://web.archive.org/web/20150319205455/http://www.mstrust.org.uk/shop/product.jsp?prodid=405, 28 pages.

(Continued)

*Primary Examiner* — Yuri Kan
(74) *Attorney, Agent, or Firm* — Barnes & Thornburg LLP

(57) ABSTRACT

A vehicle seat in accordance with the present disclosure includes a seat bottom and a seat back. The seat back is coupled to the seat bottom to move relative to the seat bottom. The seat bottom is coupled to a floor of a vehicle and configured to move relative to the seat back.

21 Claims, 13 Drawing Sheets

(51) Int. Cl.
*B60N 2/64* (2006.01)
*B60N 2/22* (2006.01)
*B60N 2/00* (2006.01)
*B60N 2/18* (2006.01)
*B60N 2/90* (2018.01)

(52) U.S. Cl.
CPC ................ *B60N 2002/0236* (2013.01); *B60N 2002/0268* (2013.01)

(56) References Cited

U.S. PATENT DOCUMENTS

| | | |
|---|---|---|
| 5,022,385 A | 6/1991 | Harza |
| 5,076,643 A | 12/1991 | Colasanti |
| 5,137,329 A | 8/1992 | Neale |
| 5,243,267 A | 9/1993 | Ogasawara |
| 5,533,787 A | 7/1996 | Xiang |
| 5,558,399 A | 9/1996 | Serber |
| 5,772,281 A | 6/1998 | Massara |
| 5,816,653 A | 10/1998 | Benson |
| 6,088,642 A | 7/2000 | Finkelstein |
| 6,098,000 A | 8/2000 | Long |
| 6,565,153 B2 | 5/2003 | Hensel |
| 6,616,228 B2 | 9/2003 | Heidmann |
| 6,663,178 B2 | 12/2003 | Fourrey |
| 7,424,760 B2 | 9/2008 | Chaffee |
| 8,857,908 B2 | 10/2014 | Brncick |
| 2006/0001304 A1* | 1/2006 | Walker .................. A47C 7/462 297/284.8 |
| 2006/0103204 A1* | 5/2006 | Walker .................. B60N 2/66 297/284.4 |
| 2007/0106188 A1* | 5/2007 | Walker .................. A61F 5/028 602/19 |
| 2011/0025111 A1 | 2/2011 | Wornell |
| 2017/0349061 A1 | 12/2017 | Benson |

FOREIGN PATENT DOCUMENTS

| | | |
|---|---|---|
| JP | 2008230366 | 10/2008 |
| JP | 5794168 B2 | 8/2013 |
| JP | 2017190008 | 10/2017 |

OTHER PUBLICATIONS

Anatomy of Sitting, available from https://www.vectorstock.com/royalty-free-vector/anatomy-of-sitting-vector-15445531, available at least by Feb. 25, 2019, 4 pages.

* cited by examiner

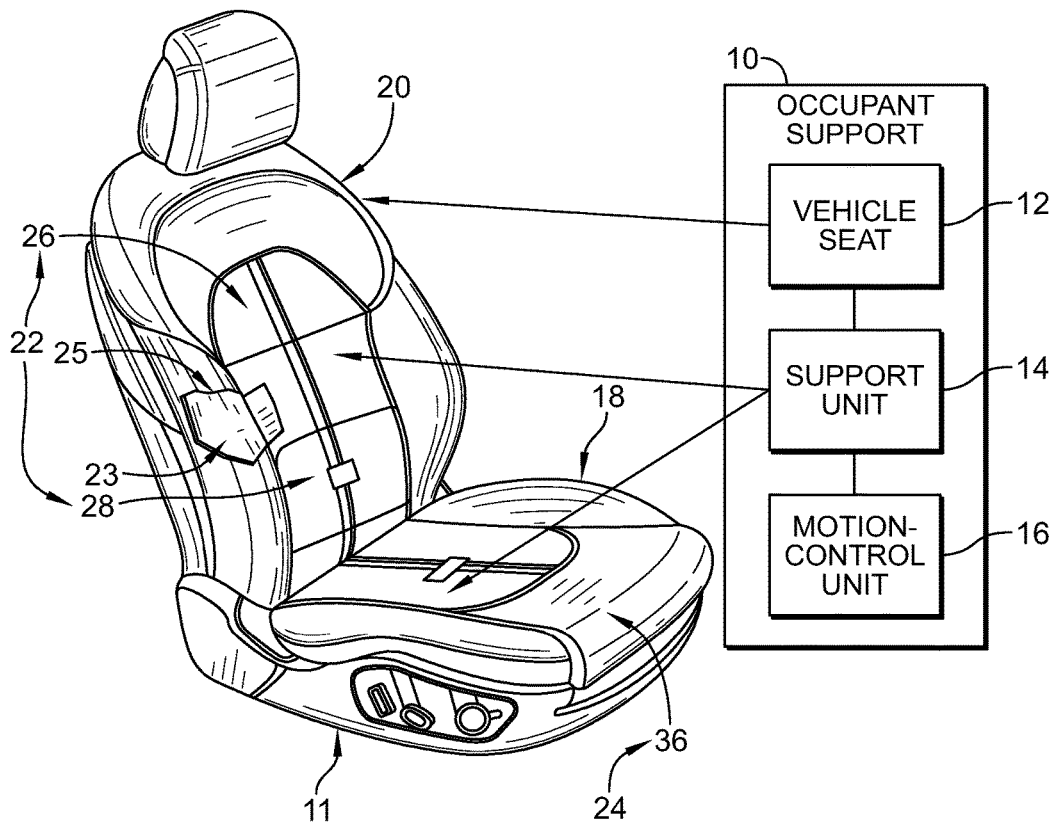
FIG. 1
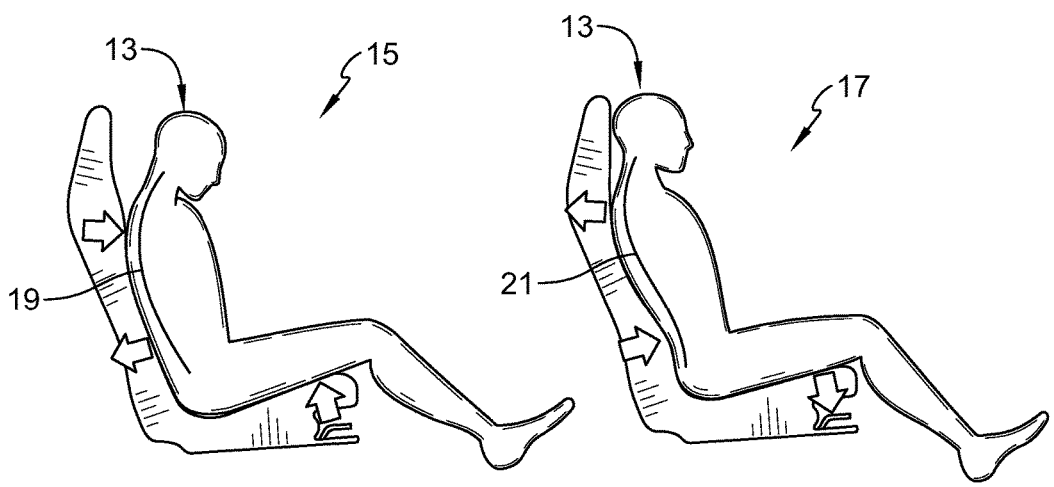
FIG. 2
FIG. 3

OCCUPANT SUPPORT

PRIORITY CLAIM

This application claims priority under 35 U.S.C. § 119(e) to U.S. Provisional Application Ser. No. 62/422,215, filed Nov. 15, 2016, which is expressly incorporated by reference herein.

BACKGROUND

The present disclosure relates to an occupant support and particularly to a vehicle seat. More particularly, the present disclosure relates to an adjustable vehicle seat.

SUMMARY

According to the present disclosure, a vehicle seat in accordance with the present disclosure includes a seat frame, a seat bottom, and a seat back. The seat frame is arranged to lie in the vehicle seat to support the seat bottom and the seat back. The seat bottom is coupled to a floor of a vehicle. The seat back is coupled to the seat bottom and extends upwardly away from the seat bottom and the floor.

In illustrative embodiments, an occupant-support system includes the vehicle seat, a support unit, and a motion-control unit. The support unit allows free movement of an occupant relative to the vehicle seat between a compressed posture, defined by a generally c-shaped spinal posture, and expanded posture, defined by a generally s-shaped spinal posture, to promote movement of the occupant. The motion-control unit is coupled to the support unit and is configured to regulate movement of the support unit relative to the vehicle seat.

In illustrative embodiments, the support unit is configured to move relative to the vehicle seat as the occupant changes their posture and includes a back adjuster and a bottom adjuster. The motion-control unit is coupled to the back adjuster and the bottom adjuster and includes a sensor system and a control system. The sensor system is configured to sense the posture of the occupant and send input signals to the control system based on the occupant's posture relative to the vehicle seat. The control system is configured to command the back adjuster and the bottom adjuster to move and support the occupant in the position sensed by the sensor system.

In another aspect of the present disclosure, the support unit includes a seat-back pivot pan mounted to the seat back for pivotable movement relative to the seat back and a seat-bottom pivot pan mounted to the seat bottom for pivotable movement relative to the seat bottom. The motion-control unit includes a first tension adjustment system coupled to the seat-back pivot pan and a second tension adjustment system coupled to the seat-bottom pivot pan. The first and second tension adjustment systems are configured to regulate movement of the pivot pans relative to the vehicle seat and allow the occupant to adjust the responsiveness of the motion control system.

In another aspect of the present disclosure, the support unit includes a seat-back pad coupled to the seat back and a seat-bottom pad coupled to the seat bottom. The seat-back pad and the seat-bottom pad each include a plurality of pneumatic bladders that form a closed loop such that the deflation of at least one bladder causes the inflation of at least one other bladder. The motion-control unit includes a pump system configured to inflate the plurality of bladders to a desired volume and a manifold configured to deflate the plurality of bladders.

In another aspect of the present disclosure, the support unit includes a seat-back pivot pan arranged to lie between a first seat-back pad and a second seat-back pad. The seat-back pivot pan is mounted to the seat back for pivotable movement relative to the seat back. The first and second seat-back pads include a plurality of pneumatic bladders that form a closed loop. The seat-back pivot pan cooperates with the first and second seat-back pads to emphasis the movement of the occupant as the occupant changes postures. The support unit may further include a similar arrangement of a pivot pan and first and second pads in the seat bottom of the vehicle seat.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of an occupant support, in accordance with the present disclosure, showing that the occupant support includes a vehicle seat having a seat bottom and a seat back, a support unit coupled to the vehicle seat, and a motion-control unit coupled to the support unit configured to control adjustment of the support unit relative to the vehicle seat;

FIGS. 2 and 3 are a series of diagrammatic views of the occupant seated on the occupant support showing that the support unit is configured to move relative to the vehicle seat to adjust a posture of the occupant from a compressed posture, in which the occupant has a generally c-shaped spine arrangement, as shown in FIG. 2, to an expanded posture, in which the occupant has a generally s-shaped spine arrangement, as shown in FIG. 3, to promote movement of the occupant relative to the vehicle seat between the compressed posture and the expanded posture to maximize occupant comfort;

FIG. 2 is a diagrammatic view of the occupant support showing that the generally c-shaped spine arrangement is defined when a lower portion of the seat back is compressed toward the vehicle seat, an upper portion of the seat back is extended outward away from the seat back simultaneously with the compression of the lower portion of the seat back, and the seat bottom is tilted upwardly away from a vehicle floor;

FIG. 3 is a diagrammatic view of the occupant support showing that the generally s-shaped spine arrangement is defined when the lower portion of the seat back is extended outward from the seat back, the upper portion of the seat back is compressed toward the seat back simultaneously with the extension of the lower portion of the seat back, and the seat bottom is tilted downwardly toward the vehicle floor;

FIG. 4 is a diagrammatic view of the occupant support, in accordance with the present disclosure, showing that the support unit includes a back adjuster coupled to the seat back and a bottom adjuster coupled to the seat bottom and showing that the motion-control unit includes a sensor system arranged to lie in the seat bottom and the seat back and a control system configured to receive input signals from the sensor system and command the back adjuster and the bottom adjuster to move the support unit based on the input signals;

FIG. 5 is a perspective view of another occupant support, in accordance with the present disclosure, showing that the occupant support includes a vehicle seat having a seat bottom and a seat back, a support unit including a seat-back pan and a seat-bottom pan, and a motion-control unit coupled to the support unit and configured to control adjustment of the support unit relative to the vehicle seat;

FIG. 6 is an exploded assembly view of the occupant support of FIG. 5;

FIG. 7 is a sectional view of the occupant support of FIGS. 5 and 6 showing that the seat-back pan is mounted to the seat back for pivotable movement about a seat-back pan axis to allow movement of an occupant from the compressed posture as shown in FIG. 2 to the expanded posture as shown in FIG. 3 and showing that the seat-bottom pan is mounted to the seat bottom for pivotable movement about a seat-bottom pan axis to allow movement of the occupant from the compressed posture to the expanded posture;

FIG. 8 is an enlarged partial perspective view of the motion-control unit coupled to the seat back and the seat-back pan showing that the motion-control unit includes a motor, a gear system coupled to the motor and the seat-back pan, and a mount system coupled to the seat-back pan;

FIG. 9 is a perspective view of another occupant support, in accordance with the present disclosure, showing that the occupant support includes a vehicle seat having a seat bottom and a seat back, a support unit including a seat-back pneumatic system and a seat-bottom pneumatic system, and a motion-control unit coupled to the support unit and configured to control adjustment of the support unit relative to the vehicle seat;

FIG. 10 is an exploded assembly view of the occupant support of FIG. 9;

FIG. 11 is a sectional view of the occupant support of FIGS. 9 and 10 showing that the seat-back pneumatic system includes a plurality of back bladders arranged to lie between a back-support pan and a back cushion and is configured to allow movement of an occupant from the compressed posture as shown in FIG. 2 to the expanded posture as shown in FIG. 3 and showing that the seat-bottom pneumatic system includes a plurality of bottom bladders arranged to lie between a bottom-support pan and a back cushion and is configured is to allow movement of the occupant from the compressed posture to the expanded posture;

FIG. 15A is a front elevation view of a first bladder arrangement, in accordance with the present disclosure, showing that the first bladder arrangement includes six bladders arranged in two rows of three bladders each, the bladders form a closed circuit such that each bladder is in fluid communication with one another;

FIG. 15B is a front elevation view of a second bladder arrangement, in accordance with the present disclosure, showing that the second bladder arrangement includes two bladders arranged to lie in top-bottom relation to one another and showing that the bladders form a closed circuit such that each bladder is in fluid communication with the other bladder;

FIG. 15C is a front elevation view of a third bladder arrangement, in accordance with the present disclosure, showing that the third bladder arrangement includes three bladders arranged to lie in top-bottom relation to one another and showing that the bladders form a closed circuit such that each bladder is in fluid communication with one another;

FIG. 15D is a front elevation view of a fourth bladder arrangement, in accordance with the present disclosure, showing that the fourth bladder arrangement includes two bladders arranged to lie in side-to-side relation to one another and showing that the bladders form a closed circuit such that each bladder is in fluid communication with the other bladder;

FIG. 15E is a front elevation view of a fifth bladder arrangement, in accordance with the present disclosure, showing that the fifth bladder arrangement includes a plurality of bladders arranged to lie in a physiological arrangement and showing that the bladders form a closed circuit such that each bladder is in fluid communication with one another;

FIG. 15F is a front elevation view of a sixth bladder arrangement, in accordance with the present disclosure, showing that the sixth bladder arrangement includes a plurality of relatively small bladders and showing that the bladders form a closed circuit such that each bladder is in fluid communication with one another;

Figure 15A:
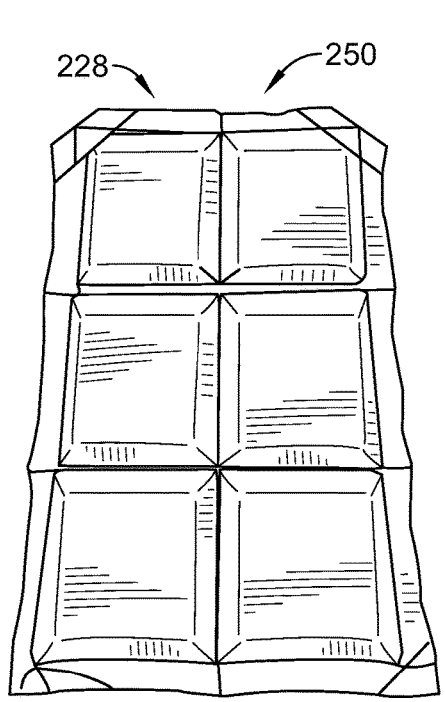
FIGS. 15A-15G are a series of bladder arrangements that may be used in at least one of the seat-back pneumatic system and the seat-bottom pneumatic system.
Figure 15B:
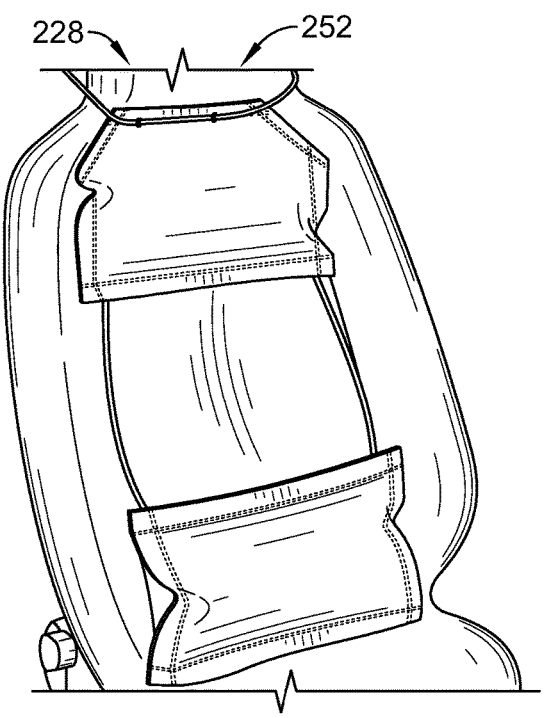
Figure 15D:
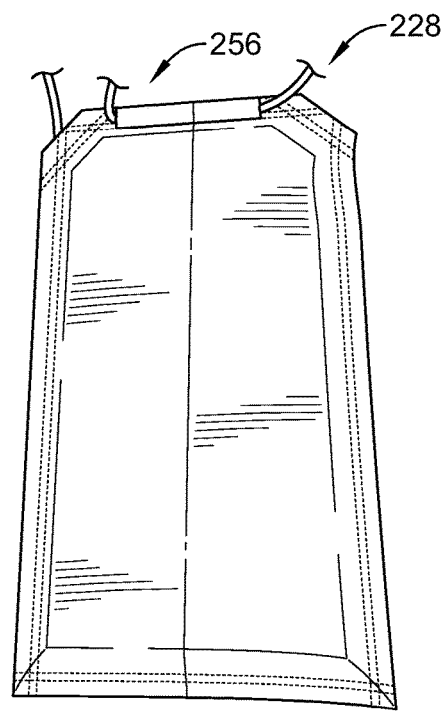
Figure 15C:
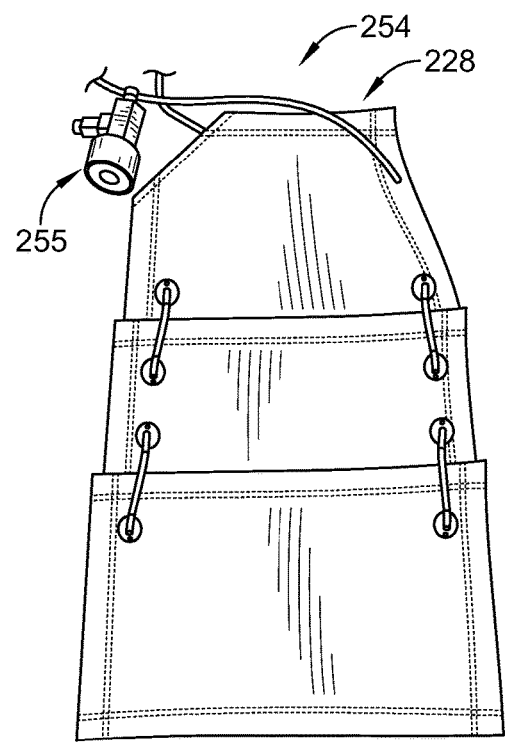
Figure 15E:
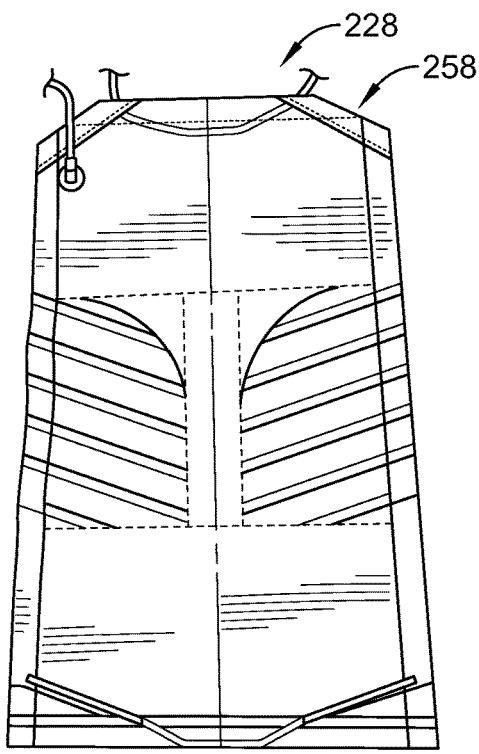
Figure 15F:
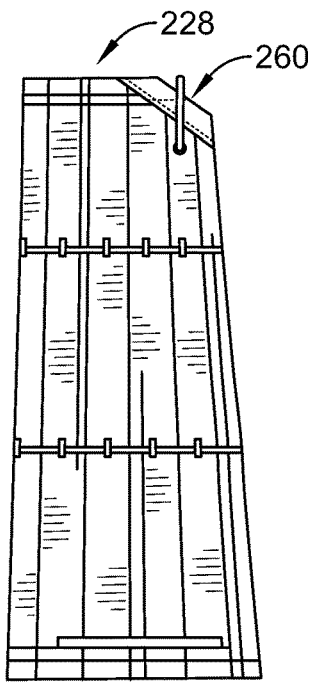
Figure 15G:
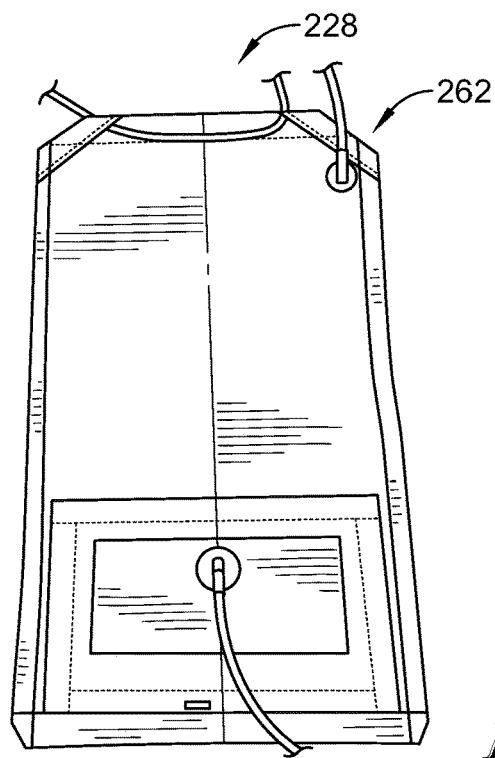
Figure 16:
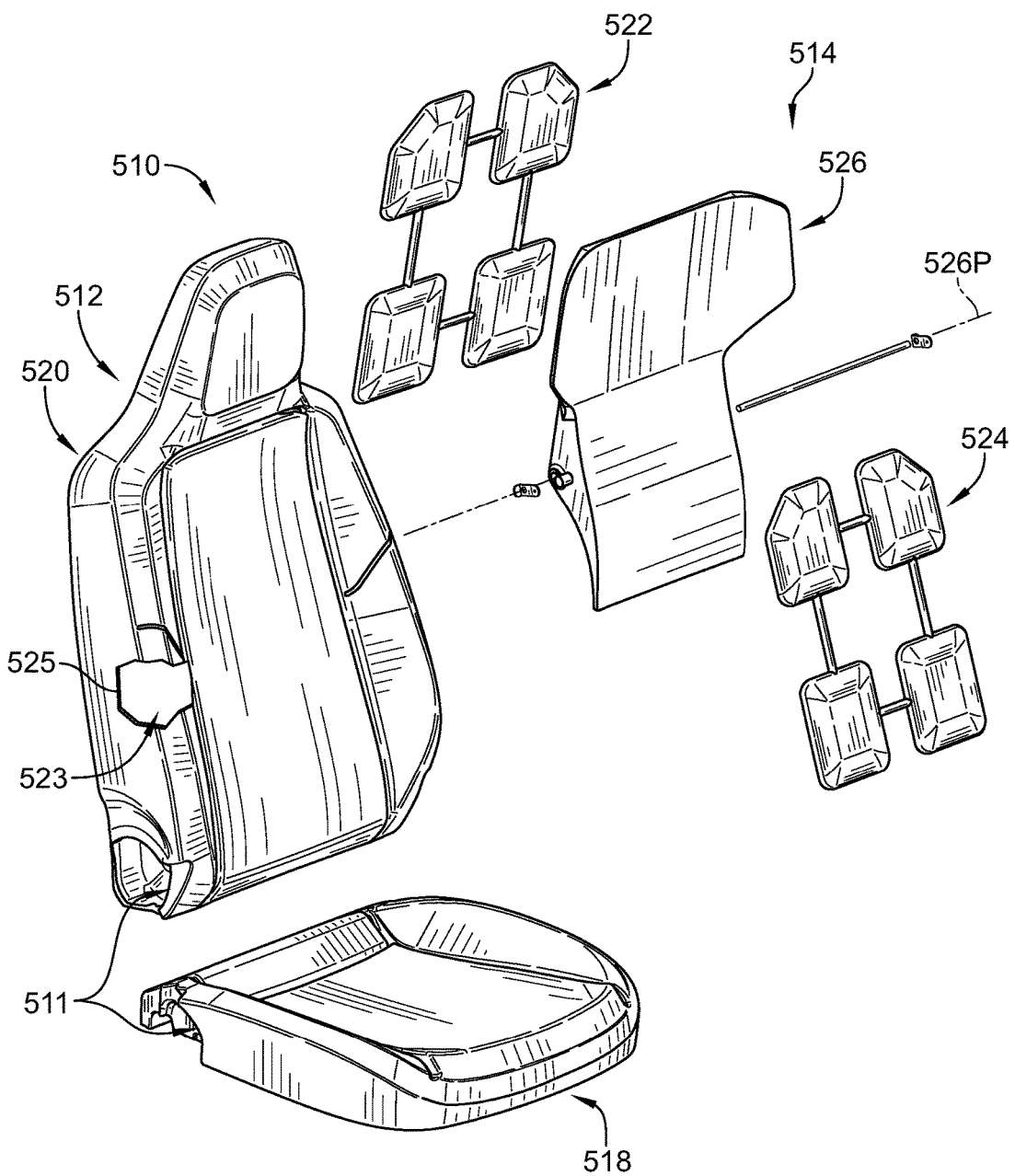
Figure 17:
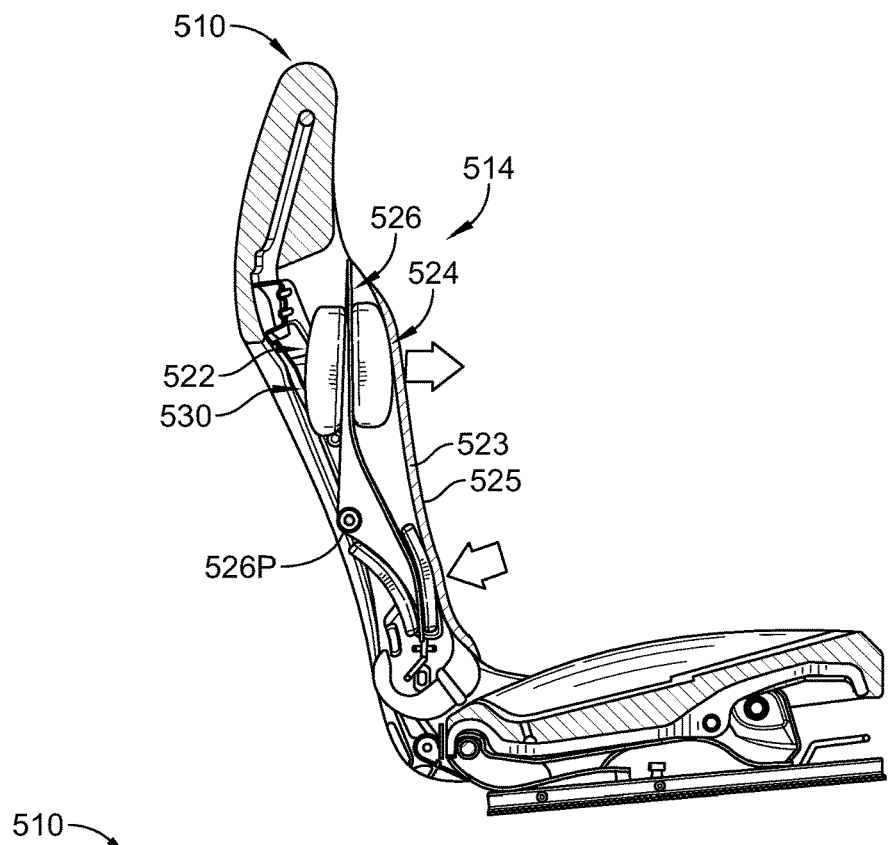
Figure 18:
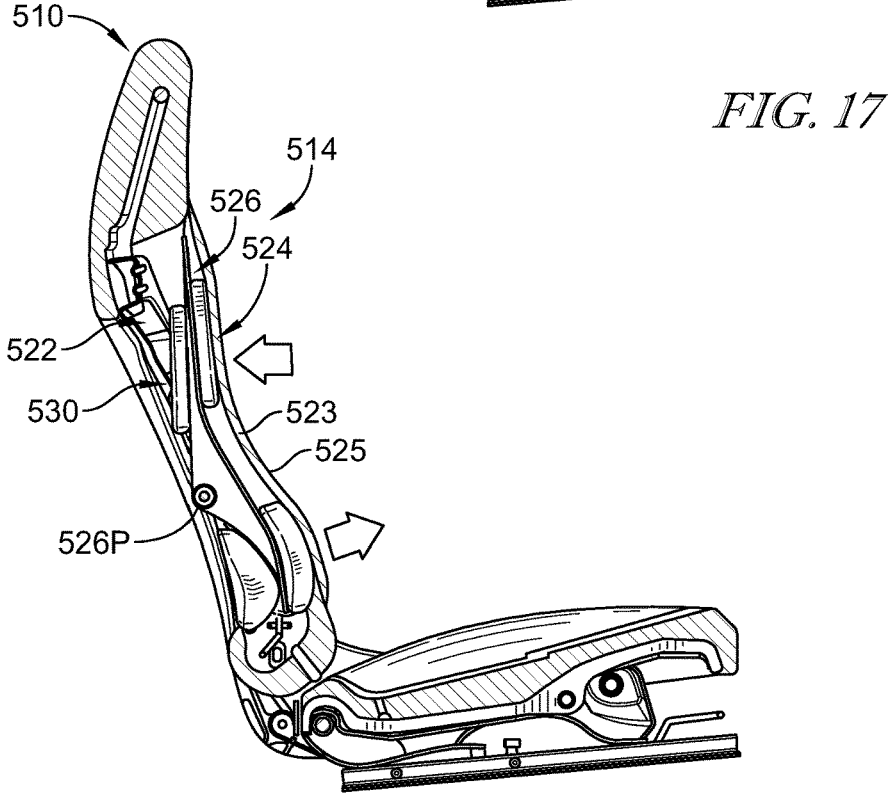

FIG. 15G is a front elevation view of a seventh bladder arrangement, in accordance with the present disclosure, showing that the seventh bladder arrangement includes a two air bladders arranged to lie in side-to-side relation to one another and a lumbar bladder containing a foam insert therein and showing that the bladders form a closed circuit such that each bladder is in fluid communication with one another;

FIG. 16 is an exploded assembly view of another occupant support, in accordance with the present disclosure, showing that the occupant support includes a vehicle seat having a seat bottom and a seat back and a support unit including a seat-back adjuster system and a seat-bottom adjuster system;

FIGS. 17 and 18 are a series of side views of the occupant support of FIG. 16 showing that the seat-back adjuster system includes a seat-back pan mounted to the seat back for pivotable movement relative thereto, a first bladder system arranged to lie between a back plate and the seat-back pan, and a second bladder system arranged to lie between the seat-back pan and a seat cushion, the first and second bladder systems configured to cooperate with the seat-back pan to emphasize the pivotable movement of the seat-back pan relative to the seat back as the occupant moves between the compressed posture as shown in FIG. 17 and the expanded posture as shown in FIG. 18;

FIG. 17 is a side elevation view of the occupant support with portions removed to show that upper bladders of the first and second bladder systems are inflated and lower bladders of the first and second bladder systems are deflated and the seat-back pan is pivoted forward relative to the seat back such that an occupant is supported on the occupant support by the support unit in the compressed posture; and FIG. 18 is a side elevation view of the occupant support with portions removed to show that the upper bladders of the first and second bladder systems are deflated and the lower bladders of the first and second bladder systems are inflated so that the seat-back pan is pivoted backward relative to the seat back such that an occupant is supported on the occupant support by the support unit in the expanded posture.

DETAILED DESCRIPTION

An occupant support 10, 110, 210, 310, 410, and 510, in accordance with the present disclosure, is configured to support an occupant 13 in a vehicle and includes a vehicle seat 12, 112, 212, 312, 412, 512 and a support unit 14, 114, 214, 314, 414, and 514 coupled to the vehicle seat as shown in FIG. 1. The support unit is configured to provide means for allowing free movement of an occupant relative to the vehicle seat between a compressed posture 15 and expanded posture 17 to promote movement of the occupant as suggested in FIGS. 2 and 3 so that comfort over time is maximized.

Over time, occupants 13 seated on occupant support 10 may experience discomfort and feel urged to adjust their posture relative to the vehicle seat, in particular, the occupant's spinal posture. Adjustment of spinal posture occurs through compressions and decompressions of the spines vertebrate as the occupant 13 moves their torso so that their spinal posture changes between the compressed posture 15, defined by a generally c-shaped posture 19 as shown in FIG. 2, and the expanded posture 17, defined by a generally s-shaped posture 21 as shown in FIG. 3.

Figure 7:
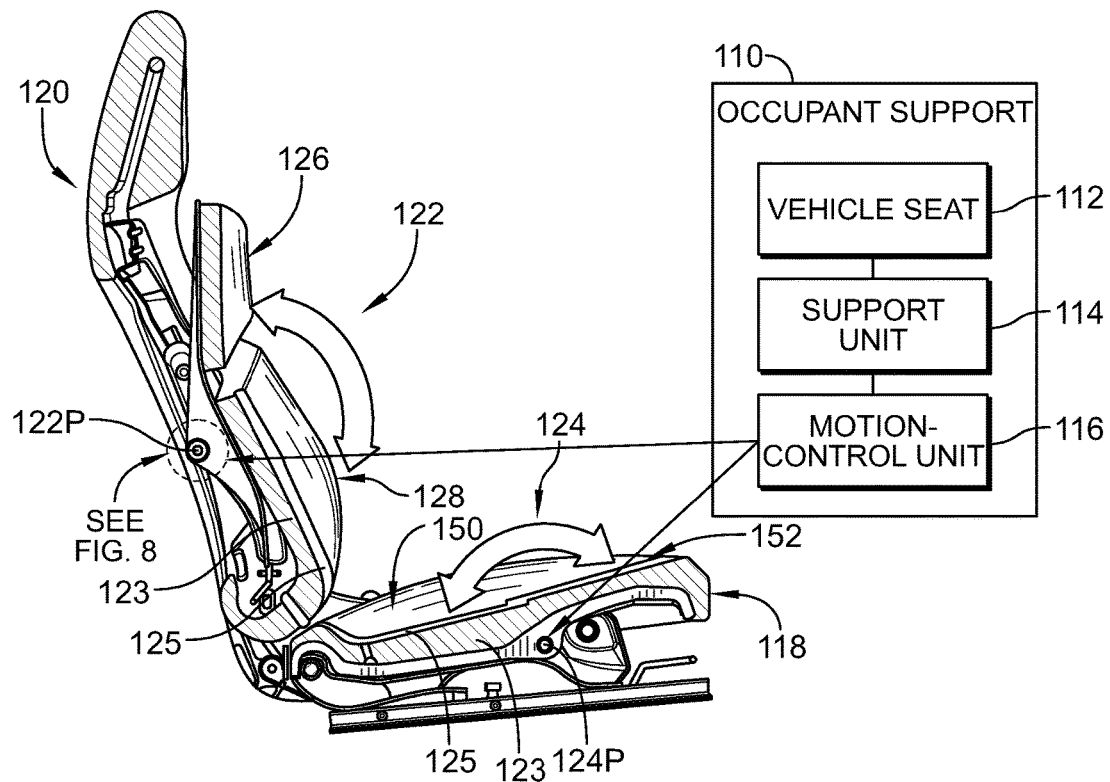

In one example, the support unit 114 includes a seat-back pivot pan and a seat-bottom pivot pan 124 each mounted to the vehicle seat 112 for pivotable movement relative to the vehicle seat 112 so that the occupant may pivot the pans to move between the compressed posture 15 and the expanded posture 17 as suggested in FIG. 7. In another example, the support unit 214 includes a seat-back pad 222 and a seat-bottom pad 224 each having a plurality of pneumatic bladders 228, 240 so that the occupant may inflate and deflate the bladders to move between the compressed posture 15 and the expanded posture 17 as suggested in FIG. 10.

In other embodiments, the occupant support may further include a motion-control unit 16, 116, 216 coupled to the support unit 14, 114, 214. The motion-control unit is configured to provide means for controlling movement of the support unit relative to the vehicle seat between the compressed posture and the expanded posture so that occupant comfort is maximized. In one example, a motion-control unit 16 includes a sensor system 30 configured to sense a posture of the occupant and a control system configured to move the support unit based on the posture of the occupant as suggested in FIG. 4. In another example, a motion-control unit 116 includes tension adjustment means configured to regulate movement the support unit relative to the vehicle seat as the occupant moves the support unit and changes postures as suggested in FIG. 7. In other examples, the motion-control unit 216 includes a pump system 234 configured to inflate the pneumatic bladders 228, 240 and manifold 236 configured to deflate the pneumatic bladders 228, 240 based on occupant preferences as suggested in FIG. 12.

A first embodiment of an occupant support 10, in accordance with the present disclosure, includes a vehicle seat 12, a support unit 14, and a motion-control unit 16 as shown in FIG. 1. The vehicle seat 12 is coupled to a floor of a vehicle to provide support for an occupant 13 during operation of the vehicle. The support unit 14 is coupled to the vehicle seat 12 and is configured to move relative to the vehicle seat 12 as the occupant 13 adjusts his/her posture to support the occupant 13 at any and all postures between a fully compressed posture 15 as shown in FIG. 2 and a fully expanded posture 17 as shown in FIG. 3. The motion-control unit 16 is configured to control the adjustment of the support unit 14 relative to the vehicle seat based on the posture of the occupant 13.

The support unit 14 is dynamic and allows movement of the occupant 13 relative to the vehicle seat 12 while supporting the occupant 13 on the vehicle seat 12. The support unit 14 is configured to support the occupant at any and all postures between the fully compressed posture 15, in which the occupant's spinal posture has a generally c-shaped posture 19, and the fully expanded posture 17, in which the occupant's spinal posture has a generally s-shaped posture 21.

Vehicle seat 12 includes a seat frame 11, a seat bottom 18, and a seat back 20 as shown in FIG. 1. Seat frame 11 is coupled to a floor of the vehicle and is configured to secure the vehicle seat 12 to the vehicle. The seat frame 11 is arranged to lie in the seat bottom 18 and the seat back 20 to rigidify the vehicle seat 12. Seat bottom 18 is coupled to seat frame 11 and provides a base for the occupant to sit on while operating the vehicle. Seat back 20 is coupled to seat bottom 18 and the seat frame 11 and extends in an upward direction away from seat bottom 18. The seat bottom 18 and the seat back 20 each include a seat cushion 23 arranged to cover the seat frame 11 and a seat trim 25 arranged to cover the seat cushion 23.

Figure 4:
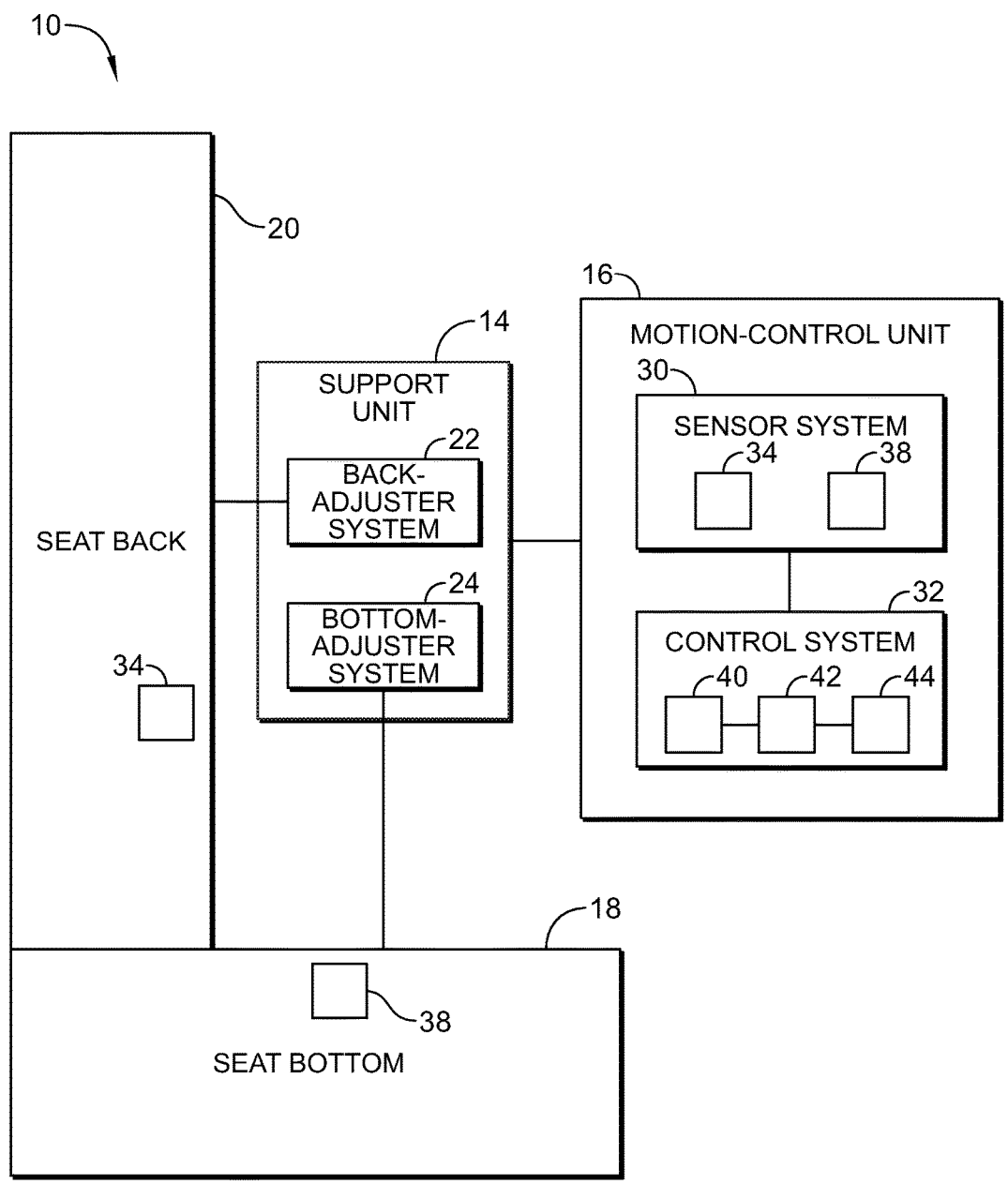

The support unit 14 includes one or more vehicle seat adjusters in at least one of the seat bottom 18 and the seat back 20. In the illustrative embodiment, the support unit 14 includes a back-adjuster system 22 and a bottom-adjuster system 24 as shown in FIG. 4. The back-adjuster system 22 and the bottom-adjuster system 24 are configured to move relative to the vehicle seat 12 with the occupant 13 as the occupant 13 adjusts their posture to support the occupant 13 at any and all postures between the compressed posture 15 and the expanded posture 17.

The back-adjuster system 22 includes an upper back adjuster 26 and a lower back adjuster 28 as shown in FIG. 4. The upper back adjuster 26 is associated with an upper back region of the occupant 13 while the lower back adjuster 28 is associated with a lumbar region of the occupant 13. The upper back adjuster 26 and the lower back adjuster 28 are configured to cooperate with one another to support the occupant 13 at any and all postures between the compressed posture 15 and the expanded posture 17. The back-adjuster system 22 is arranged between the seat frame 11 and the seat cushion 23.

The motion-control unit 16 is configured to sense a posture of the occupant 13 and move the upper back adjuster 26 and the lower back adjuster 28 to fit and support the occupant in that posture. The motion-control unit 16 includes a sensor system 30 and a control system 32 as shown in FIG. 4. The sensor system 30 is coupled to at least one of the seat bottom 18 and the seat back 20. The control system 32 is coupled to the sensor system 30 and the support unit 14 and controls movement of the upper back adjuster 26 and the lower back adjuster 28 relative to the vehicle seat 12. The sensor system 30 is arranged to lie in relatively close proximity to the occupant 13 to sense the posture of the occupant 13 and send input signals to the control system 32 based on the posture of the occupant 13. The control system 32 receives the input signals and commands the upper back adjuster 26 and the lower back adjuster 28 to adjust to fit the occupant and support the occupant in that posture.

In the illustrative embodiment, the sensor system 30 includes a first sensor 34 arranged to lie in the seat back 20 adjacent to the lumbar region of the occupant 13 as shown in FIG. 1 and suggested in FIG. 4. One or more other sensors may be arranged to lie in different areas of the seat back 20. In one example, the first sensor 34 is a pressure sensor and is arranged to lie between the seat cushion 23 and the seat trim 25. In another example, the first sensor 34 is arranged to lie on top of the seat trim 25.

The posture of the occupant 13 determines how the motion-control unit 16 will adjust the upper back adjuster 26 and the lower back adjuster 28 based on a pressure distribution of the occupant on first sensor 34. For example, the lumbar region of the occupant exerts a first force load on the first sensor 34 when the occupant's spinal posture has the generally c-shaped posture 19 as suggested in FIG. 2. The lumbar region of the occupant applies a second force load on the first sensor 34 that is lower than the first force load when the occupant's spinal posture has a generally s-shaped posture 21. As the occupant 13 applies the first force load, the control system 32 commands the lower back adjuster 28 to compress towards the seat back 20 and the upper back adjuster 26 to extend outward away from the seat back 20 to support the occupant 13 in the compressed posture 15 as shown in FIG. 2. Conversely, the occupant 13 may move and apply the second force load by adjusting their spinal posture to the generally s-shaped posture 21 so that the control system 32 commands the upper back adjuster 26 to compress towards the seat back 20 and the lower back adjuster 28 to extend outward away from the seat back 20 as shown in FIG. 3.

The support unit 14 may further include the bottom-adjuster system 24 as shown in FIGS. 1 and 4. The bottom-adjuster system 24 includes a seat-bottom tilt 36 that is configured to adjust the occupant's thighs relative to the occupant's torso. The seat-bottom tilt 36 tilts the seat bottom 18 upwardly when the occupant moves toward the compressed posture 15 as shown in FIG. 2. The seat-bottom tilt 36 tilts the seat bottom 18 downwardly when the occupant moves toward the expanded posture 17 as shown in FIG. 3.

The motion-control unit 16 is configured to sense a posture of the occupant 13 and adjust the seat-bottom tilt 36 to fit and support the occupant in that posture. In one example, the motion-control unit 16 determines the posture of the occupant with the sensor system 30 and controls the bottom-adjuster system 24 with the control system 32 so that the back-adjuster system 22 and the bottom-adjuster system 24 cooperate as the posture of the occupant changes. In another example, the motion-control unit 16 may control the back-adjuster system 22 and the bottom-adjuster system 24 independently of one another.

In the illustrative embodiment, the sensor system 30 further includes a second sensor 38 arranged to lie in the seat bottom 18 adjacent to an upper thigh region of the occupant as suggested in FIGS. 1 and 4. One or more other sensors may be arranged to lie in different areas of the seat bottom 18. In one example, the second sensor 38 is a pressure sensor and is arranged to lie between the seat cushion 23 and the seat trim 25 of the seat bottom 18. In another example, the first sensor 34 is arranged to lie on top of the seat trim 25.

The posture of the occupant 13 determines how the motion-control unit 16 will adjust the seat-bottom tilt 36 based on a pressure distribution of the occupant on second sensor 38. For example, the upper thigh region of the occupant exerts a first force load on the second sensor 38 when the occupant is arranged in the compressed posture 15 as suggested in FIG. 2. The upper thigh region of the occupant applies a second force load on the second sensor 38 that is lower than the first force load when the occupant is arranged in the expanded posture 17 as suggested in FIG. 3. As the occupant 13 applies the first force load on the second sensor 38, the control system 32 commands the seat-bottom tilt 36 to tilt upwardly away from the floor as shown in FIG. 2. Conversely, the occupant 13 may move and apply the second force load on the second sensor 38 by moving toward the expanded posture 17 so that the control system 32 commands the seat-bottom tilt 36 to tilt downwardly toward the floor as shown in FIG. 3.

The control system 32 includes a controller 40, a processor 42, and memory 44 as shown in FIG. 4. The processor 42 receives the signal from the sensor system 30 and determines the pressure distribution of the occupant based on a posture of the occupant. The processor 42 sends an input signal to the controller 40 to command the support unit 14 to move and support the occupant in the occupant's posture.

The vehicle seat is coupled to the vehicle in a fixed position. The support unit may move with the occupant as the occupant changes their posture. The support unit is movable relative to the fixed vehicle seat to maximize vehicle seat durability and occupant comfort.

Figure 5:
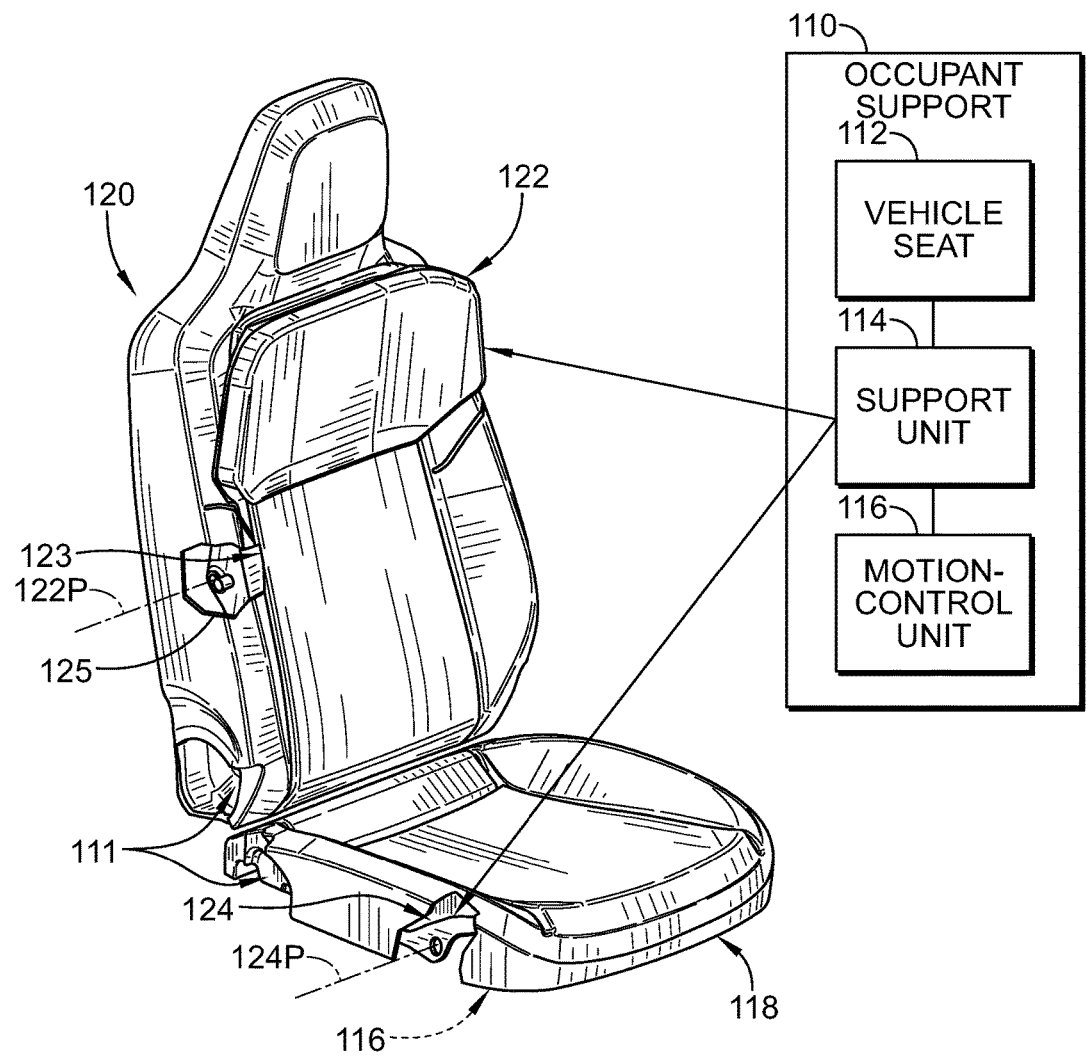

A second embodiment of an occupant support 110, in accordance with the present disclosure, includes a vehicle seat 112, a support unit 114, and a motion-control unit 116 as shown in FIG. 5. The vehicle seat 112 is coupled to a floor of a vehicle to provide support for an occupant 13 during operation of the vehicle. The support unit 114 is coupled to the vehicle seat 112 and is configured to move relative to the vehicle seat 112 as the occupant 13 adjusts their posture relative to the vehicle seat 12. The support unit 114 supports the occupant 13 at any and all postures between a fully compressed posture 15 as shown in FIG. 2 and a fully expanded posture 17 as shown in FIG. 3. The motion-control unit 116 is configured to control the adjustment of the support unit 114 relative to the vehicle seat based on the posture of the occupant 13.

The vehicle seat 112 includes a seat frame 111, a seat bottom 118, and a seat back 120 as shown in FIG. 5. Seat frame 111 is coupled to a floor of the vehicle and is configured to secure the vehicle seat 112 to the vehicle. The seat frame 111 is arranged to lie in the seat bottom 118 and the seat back 120 to rigidify the vehicle seat 112. Seat bottom 118 is coupled to seat frame 111 and provides a base for the occupant to sit on while operating the vehicle. Seat back 120 is coupled to seat bottom 118 and the seat frame 111 and extends in an upward direction away from seat bottom 118. The seat bottom 118 and the seat back 120 each include a seat cushion 23 arranged to cover the seat frame 111 and a seat trim 125 arranged to cover the seat cushion 123.

The support unit 114 includes one or more vehicle seat adjusters in at least one of the seat bottom 118 and the seat back 120. In the illustrative embodiment, the support unit 14 includes a seat-back pivot pan 122 and a seat-bottom pivot pan 124 as shown in FIG. 5. The seat-back pivot pan 122 and the seat-bottom pivot pan 124 are configured to move automatically as the occupant 13 adjusts their posture relative to the vehicle seat 112 to support the occupant 13 on the vehicle seat 12 at any and all postures between the compressed posture 15 and the expanded posture 17.

Figure 6:
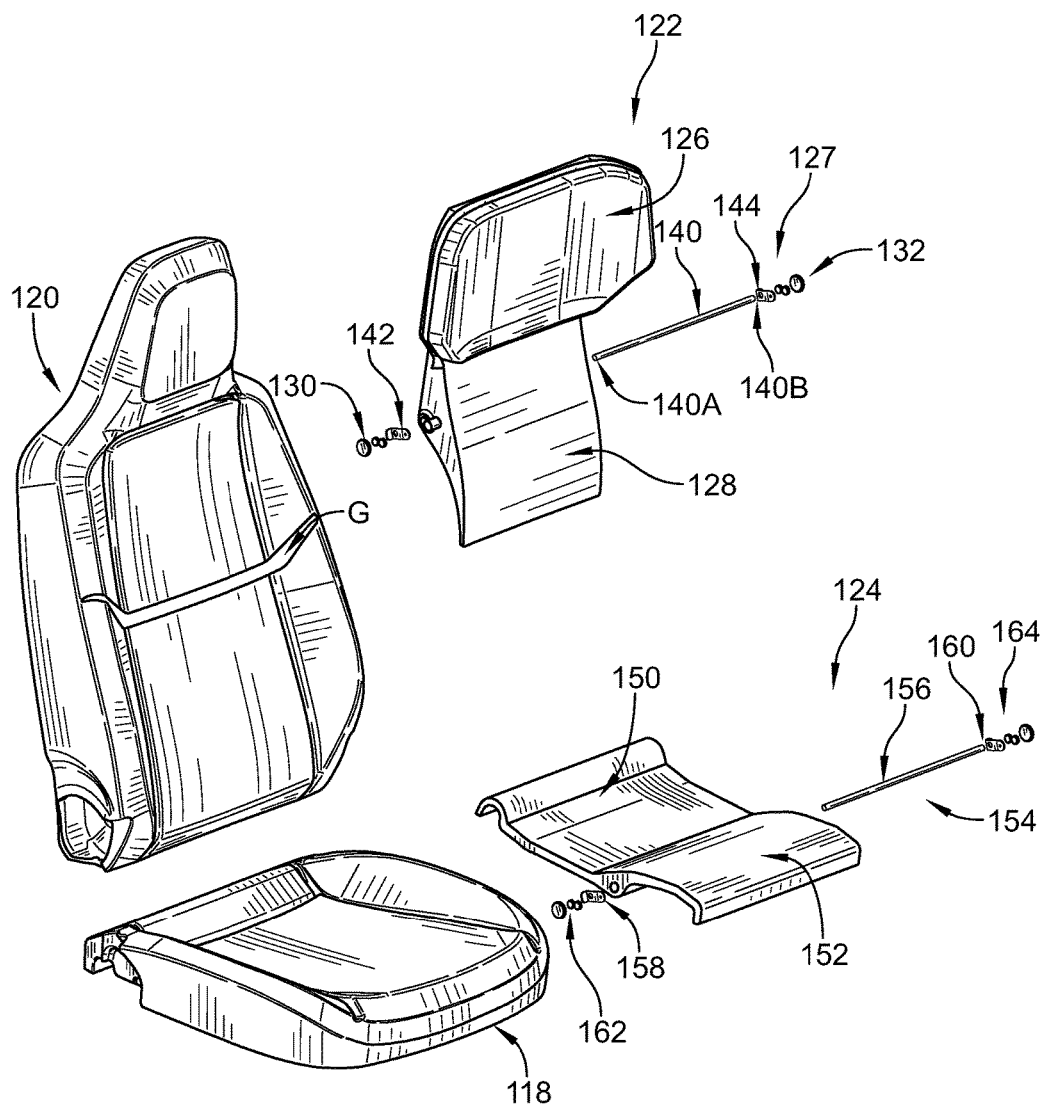

The seat-back pivot pan 122 includes an upper back support 126, a lower back support 128, and a mount system 127 as shown in FIG. 6. The upper back support 126 is associated with an upper back region of the occupant 13 while the lower back support 128 is associated with a lumbar region of the occupant 13. The upper back support 126 and the lower back support 128 are configured to cooperate with one another to support the occupant 13 at any and all postures between the compressed posture 15 and the expanded posture 17. The mount system 127 couples the seat-back pivot pan 122 to the vehicle seat 112 and allows movement of the seat-back pivot pan 122 relative to the seat back 120.

The mount system 127 couples seat-back pivot pan 122 to the vehicle seat 112 for pivotable movement about a seat-back pivot pan axis 122P as shown in FIGS. 5 and 7. The mount system 127 allows the occupant 13 to move relative to the vehicle seat 112 between the compressed posture 15 and the expanded posture 17 as shown in FIGS. 2 and 3. The mount system includes a mount rod 140, a first mount bracket 142 and a second mount bracket 144 as shown in FIG. 6. The mount rod 140 is arranged to extend though mount apertures 141 formed in the seat-back pivot pan 122. The mount rod 140 includes a first end 140A coupled to the first mount bracket 142 and a second end 140B coupled to the second mount bracket 144. The first and second mount brackets 142, 144 are coupled to respective sides of the vehicle seat 112.

The motion-control unit 116 is coupled to the mount system 127 and provides tension adjustment for the upper back support 126 and the lower back support 128 as the occupant to moves between the compressed posture 15 and the expanded posture 17. The motion-control unit 116 includes a first tension adjustment system 130 coupled to the first mount bracket 142 and a second tension adjustment system 132 coupled to the second bracket 142. The tension adjustment systems 130, 132 regulate movement of the seat-back pivot pan 122 relative to vehicle seat 112 depending on force loads applied by the occupant 13 while the occupant adjusts their posture. In another example, the motion-control unit 116 includes the seat trim 125 and the seat trim 125 provides the tension adjustment for the seat-back pivot pan 122.

Figure 8:
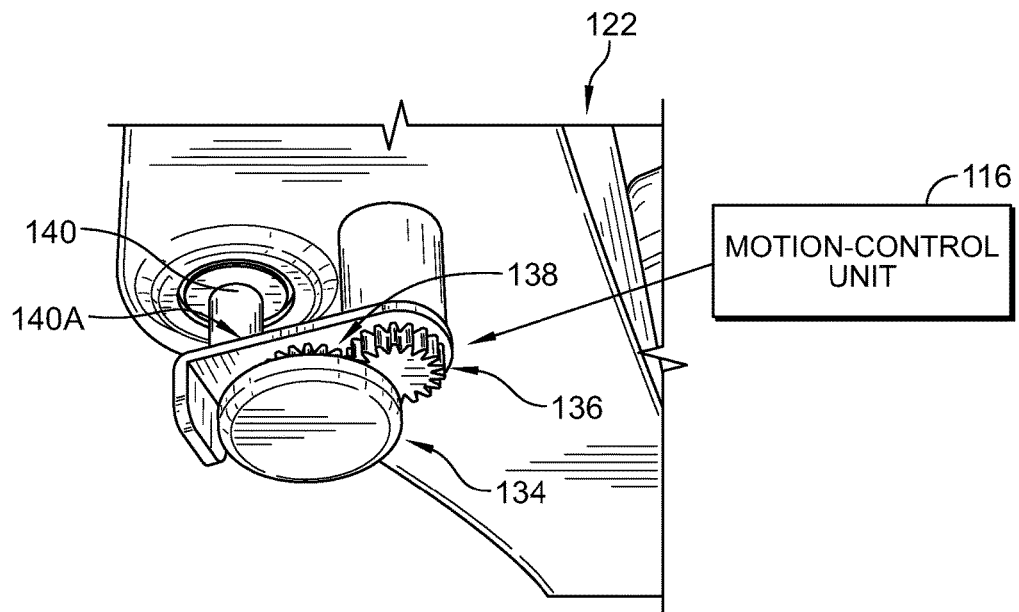

The first tension adjustment system 130 includes a motor 134, a first gear 136, and a second gear 138 as shown in FIG. 8. The first gear 136 and the second gear 138 include teeth that interlock and cooperate with one another as the seat-back pivot pan 122 pivots about the seat-back pivot pan axis 122P. The motor 134 is coupled to second gear 138 to provide the tension adjustment for the seat-back pivot pan 122. In one example, the motor 134 throttles movement of the seat-back pivot pan 122 as the occupant 13 moves the seat-back pivot pan 122. In another example, the motor 134 actively moves the seat-back pivot pan 122 to improve the occupant's posture.

The seat-back pivot pan 122 may be raised and lowered along the seat back 20 to accommodate occupants of different sizes. At least one of the first gear 136 and the second gear 138 is coupled to the seat frame 111 such that the plurality of teeth interlock and cooperate with corresponding teeth included on the seat frame 111. In this way, the motor 134 rotates the gears to cause the seat-back pivot pan 122 to climb upwardly or downwardly along the seat frame 111.

The second tension adjustment system 132 is similar to the first tension adjustment system 130. Accordingly, disclosure related to the first tension adjustment system 130 is hereby incorporated in its entirety for the second tension adjustment system 132.

The upper back support 126 is arranged to extend through a gap G in the seat trim 125 as shown in FIG. 5. However, in another embodiment, the upper back support 126 is arranged to lie under the seat trim 125. The lower back support 128 extends downwardly from the upper back support 126 and is arranged behind the seat cushion 123 relative to an occupant seated on the vehicle seat 112.

The seat-bottom pivot pan 124 includes a rear-bottom support 150, a front-bottom support 152, and a mount system 154 as shown in FIG. 6. The rear-bottom support 150 is associated with an upper thigh region of the occupant 13 while the front-bottom support 152 is associated with a lower thigh region of the occupant 13. The rear-bottom support 150 and the front-bottom support 152 are configured to cooperate with one another to support the occupant 13 at any and all postures between the compressed posture 15 and the expanded posture 17. The mount system 154 couples the seat-bottom pivot pan 124 to the vehicle seat 112 and allows movement of the seat-bottom pivot pan 124 relative to the seat bottom 118.

The mount system 154 couples the seat-bottom pivot pan 124 to the vehicle seat 112 for pivotable movement about a seat-bottom pivot pan axis 124P as shown in FIGS. 5 and 7. The mount system 154 allows the occupant 13 to move relative to the vehicle seat 112 between the compressed posture 15 and the expanded posture 17 as shown in FIGS. 2 and 3. The mount system 154 includes a mount rod 156, a first mount bracket 158 and a second mount bracket 160 as shown in FIG. 6. The mount rod 156 is arranged to extend though mount apertures 155 formed in the seat-bottom pivot pan 124. The mount rod 156 includes a first end 156A coupled to the first mount bracket 158 and a second end 156B coupled to the second mount bracket 160. The first and second mount brackets 158, 160 are coupled to respective sides of the seat bottom 118.

The motion-control unit 116 is coupled to the mount system 154 and provides tension adjustment for the rear-bottom support 150 and the front-bottom support 152 as the occupant to moves between the compressed posture 15 and the expanded posture 17. The motion-control unit 116 further includes a third tension adjustment system 162 coupled to the first mount bracket 158 and a fourth tension adjustment system 164 coupled to the second bracket 160. The tension adjustment systems 162, 164 regulate movement of the seat-bottom pivot pan 124 relative to vehicle seat 112 depending on force loads applied by the occupant 13 while the occupant adjusts their posture. In another example, the motion-control unit 116 includes the seat trim 125 and the seat trim 125 provides the tension adjustment for the seat-bottom pivot pan 124.

The third and fourth tension adjustment systems 162, 164 are similar to the first tension adjustment system 130. Accordingly, disclosure related to the first tension adjustment system 130 is hereby incorporated in its entirety for the third and fourth tension adjustment systems 162, 164.

Figure 9:
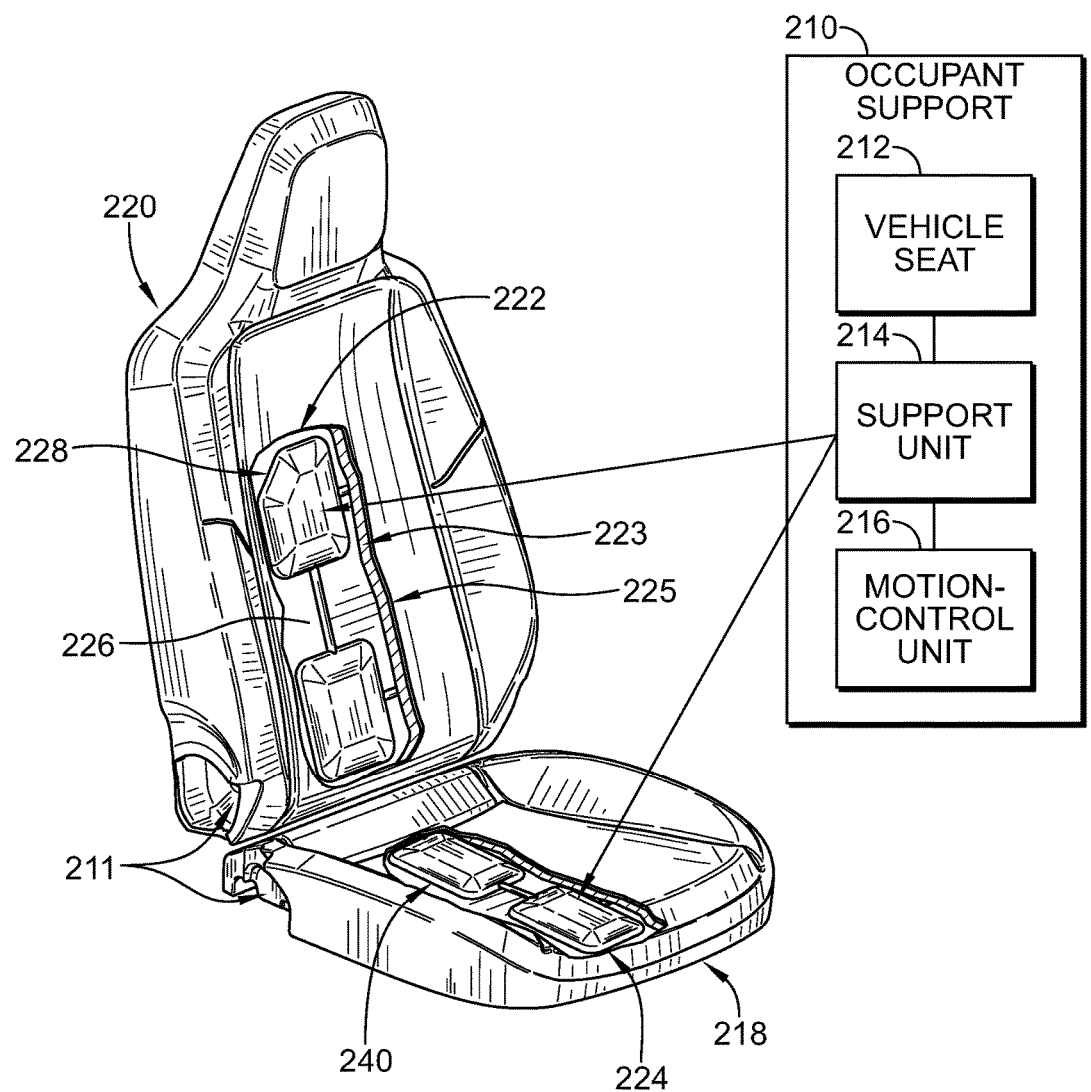

A third embodiment of an occupant support 210, in accordance with the present disclosure, includes a vehicle seat 212, a support unit 214, and a motion-control unit 216 as shown in FIG. 9. The vehicle seat 212 is coupled to a floor of a vehicle to provide support for an occupant 13 during operation of the vehicle. The support unit 214 is coupled to the vehicle seat 212 and is configured to move relative to the vehicle seat 212 as the occupant 13 adjusts their posture relative to the vehicle seat 12. The support unit 214 supports the occupant 13 at any and all postures between a fully compressed posture 15 as shown in FIG. 2 and a fully expanded posture 17 as shown in FIG. 3. The motion-control unit 216 is configured to control the adjustment of the support unit 214 relative to the vehicle seat based on the posture of the occupant 13.

The vehicle seat 212 includes a seat frame 211, a seat bottom 218, and a seat back 220 as shown in FIG. 9. Seat frame 211 is coupled to a floor of the vehicle and is configured to secure the vehicle seat 212 to the vehicle. The seat frame 211 is arranged to lie in the seat bottom 218 and the seat back 220 to rigidify the vehicle seat 212. Seat bottom 218 is coupled to seat frame 211 and provides a base for the occupant to sit on while operating the vehicle. Seat back 220 is coupled to seat bottom 218 and the seat frame 211 and extends in an upward direction away from seat bottom 218. The seat bottom 218 and the seat back 220 each include a seat cushion 223 arranged to cover the seat frame 211 and a seat trim 225 arranged to cover the seat cushion 23.

The support unit 214 includes one or more vehicle seat adjusters in at least one of the seat bottom 218 and the seat back 220. In the illustrative embodiment, the support unit 214 includes a seat-back pad 222 and a seat-bottom pad 224 as shown in FIG. 9. The seat-back pad 222 and the seat-bottom pad 224 are configured to move automatically as the occupant 13 adjusts their posture relative to the vehicle seat 212 to support the occupant 13 on the vehicle seat 212 at any and all postures between the compressed posture 15 and the expanded posture 17.

The seat-back pad 222 includes a support plate 226 and a plurality of pneumatic bladders 228 as shown in FIG. 9. The support plate 226 supports the plurality of bladders 228 on the seat back 220. The plurality of bladders 228 is configured to cooperate with one another to support the occupant 13 at any and all postures between the compressed posture 15 and the expanded posture 17.

Figure 10:
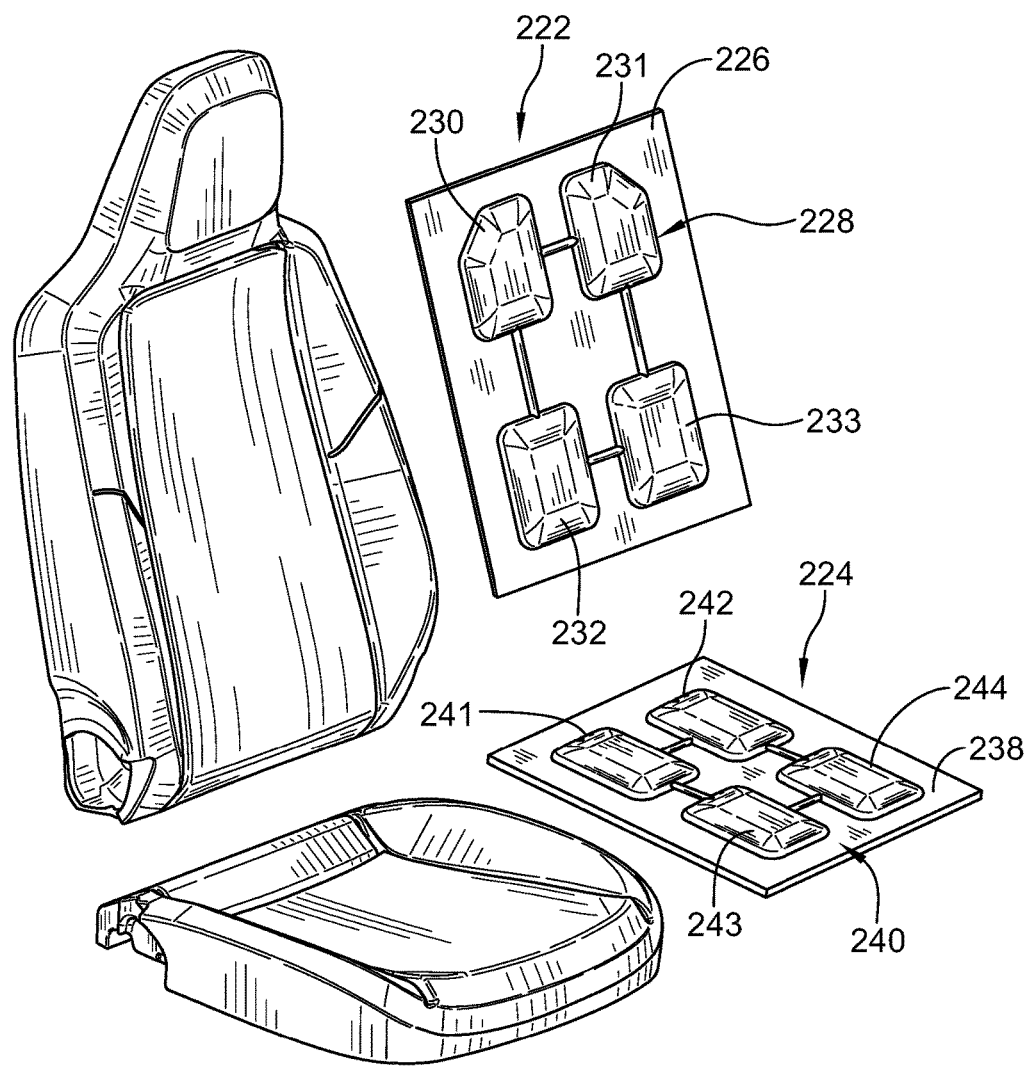
Figure 11:
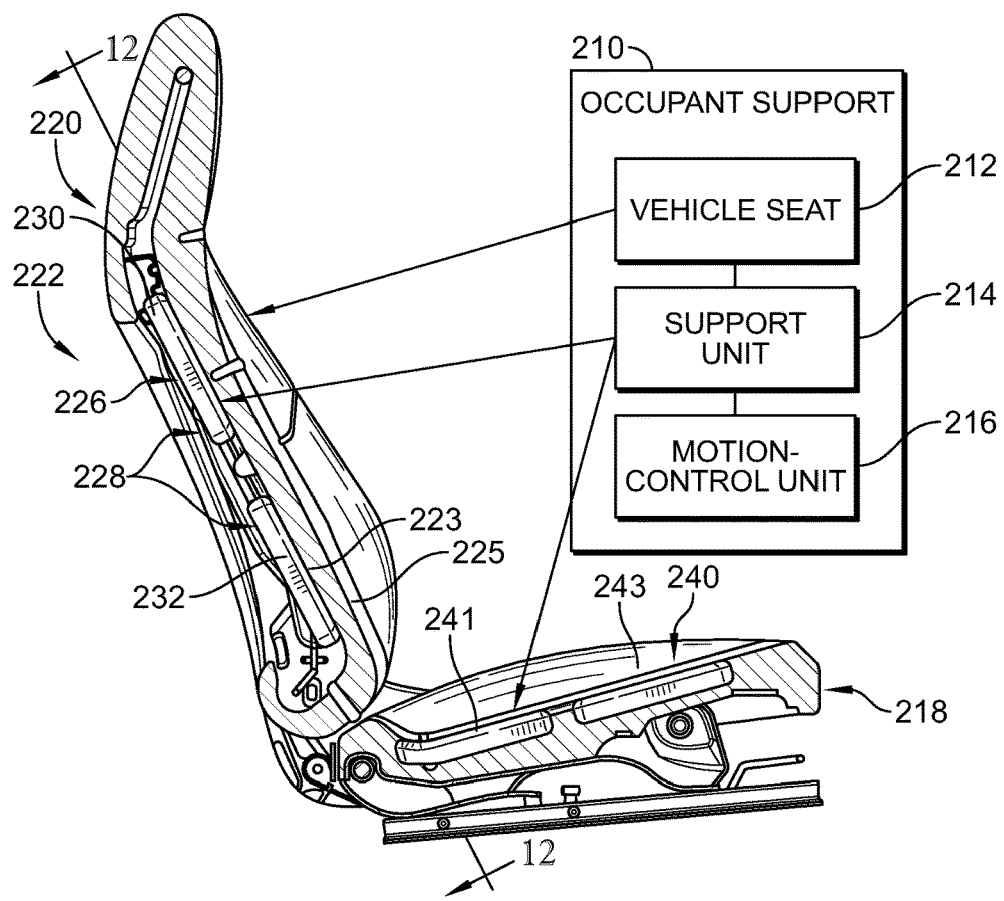
Figure 12:
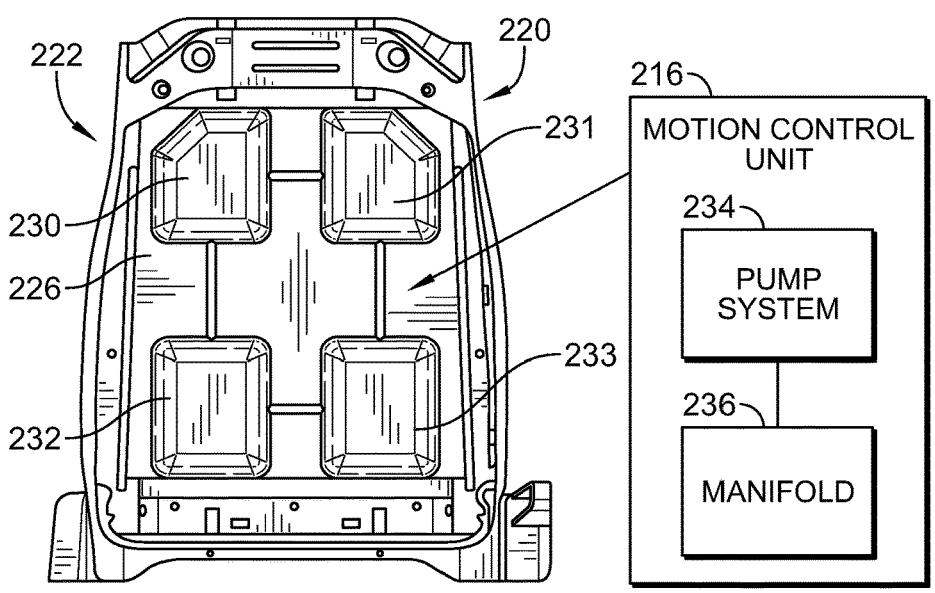
FIG. 12 is a sectional view of the seat back and the seat-back pneumatic system of FIG. 11 showing that the motion-control unit includes a pump system configured to inflate the bladders, a manifold coupled to the pump system, and a control system configured to command the pump system and the manifold to inflate and deflate the bladders to adjust the posture of the occupant.

The plurality of bladders 228 form are coupled to one another and form a closed loop such that the deflation of at least one bladder causes the inflation of at least one other bladder and vice versa. In the illustrative embodiment, the plurality of bladders 228 in the seat-back pad 222 includes a first bladder 230, a second bladder 231, a third bladder 232, and a fourth bladder 233 as shown in FIGS. 10 and 12. The first and second bladders 230, 231 are arranged to lie adjacent to an upper-back region of the occupant. The third and fourth bladders 232, 233 are arranged to lie adjacent to a lumbar region of the occupant. The bladders 230, 231, 232, 233 are coupled in series to form the closed loop.

As the occupant moves from the compressed posture 15 to the expanded posture 17, the occupant's upper-back region and lumbar region apply a pressure distribution over the seat-back pad 222 that changes as the occupant moves. The closed loop provided by the plurality of bladders 228 allows the occupant to move relative to the vehicle seat 212 and remain supported by support unit 214. For example, in the compressed posture, the occupant applies a greater force load on the third and fourth bladders 232, 233 to cause the third and fourth bladders 232, 233 to deflate and the first and second bladders 230, 231 to inflate. The lumbar region of the occupant moves towards the vehicle seat 212 as the third and fourth bladders 232, 233 deflate while the upper-back region of the occupant moves away from the vehicle seat 212 as the first and second bladders 230, 231 inflate to provide the c-shaped spinal posture 19. Conversely, in the expanded posture, the occupant applies a greater force load on the first and second bladders 230, 231 to cause the first and second bladders 230, 231 to deflate and the third and fourth bladders 232, 233 to inflate. The upper-back region of the occupant moves towards the vehicle seat 212 as the first and second bladders 230, 231 deflate while the lumbar region of the occupant to moves away from the vehicle seat 212 as the third and fourth bladders 232, 233 deflate to provide the s-shaped spinal posture 21.

The motion-control unit 216 includes a pump system 234 and a manifold 236 as shown in FIG. 12. The pump system 234 may include one or more pumps coupled to the plurality of bladders 228 to inflate the plurality of bladders to a desired size preferred by the occupant. The manifold 236 allows the plurality of bladders 228 to deflate to the desired size preferred by the occupant. In the illustrative embodiment, the plurality of bladders 228 is filled with air. However, any suitable fluid may be used within the bladders 228.

The seat-bottom pad 224 includes a support plate 238 and a plurality of pneumatic bladders 240 as shown in FIG. 10. The support plate 238 supports the plurality of bladders 240 on the seat bottom 218. The plurality of bladders 240 is arranged to lie between the seat cushion 223 and the support plate 238. The plurality of bladders 240 is configured to cooperate with one another to support the occupant 13 at any and all postures between the compressed posture 15 and the expanded posture 17.

The plurality of bladders 240 are coupled to one another and form a closed loop such that the deflation of at least one bladder causes the inflation of at least one other bladder and vice versa. In the illustrative embodiment, the plurality of bladders 240 in the seat-bottom pad 224 includes a first bladder 241, a second bladder 242, a third bladder 243, and a fourth bladder 244 as shown in FIG. 10. The first and second bladders 241, 242 are arranged to lie adjacent to a upper thigh region of the occupant. The third and fourth bladders 243, 244 are arranged to lie adjacent to a lower thigh region of the occupant. The bladders 241, 242, 243, 244 are coupled in series to form the closed loop.

As the occupant moves from the compressed posture 15 to the expanded posture 17, the occupant's upper-thigh region and lower thigh region apply a pressure distribution over the seat-bottom pad 224 that changes as the occupant moves. The closed loop provided by the plurality of bladders 240 allows the occupant to move relative to the vehicle seat 212 and remain supported by support unit 214. For example, in the compressed posture, the occupant applies a greater force load on the first and second bladders 241, 242 to cause the first and second bladders 241, 242 to deflate and the third and fourth bladders 243, 244 to inflate. The upper thigh region of the occupant moves towards the vehicle seat 212 as the first and second bladders 241, 242 deflate while the lower-thigh region of the occupant moves away from the vehicle seat 212 as the third and fourth bladders 243, 244 inflate. Conversely, in the expanded posture, the occupant applies a greater force load on the third and fourth bladders 243, 244 to cause the third and fourth bladders 243, 244 to deflate and the first and second bladders 241, 242 to inflate. The lower thigh region of the occupant moves towards the vehicle seat 212 as the third and fourth bladders 243, 244 deflate while the upper thigh region of the occupant moves away from the vehicle seat as the first and second bladders 241, 242 inflate.

Figure 13:
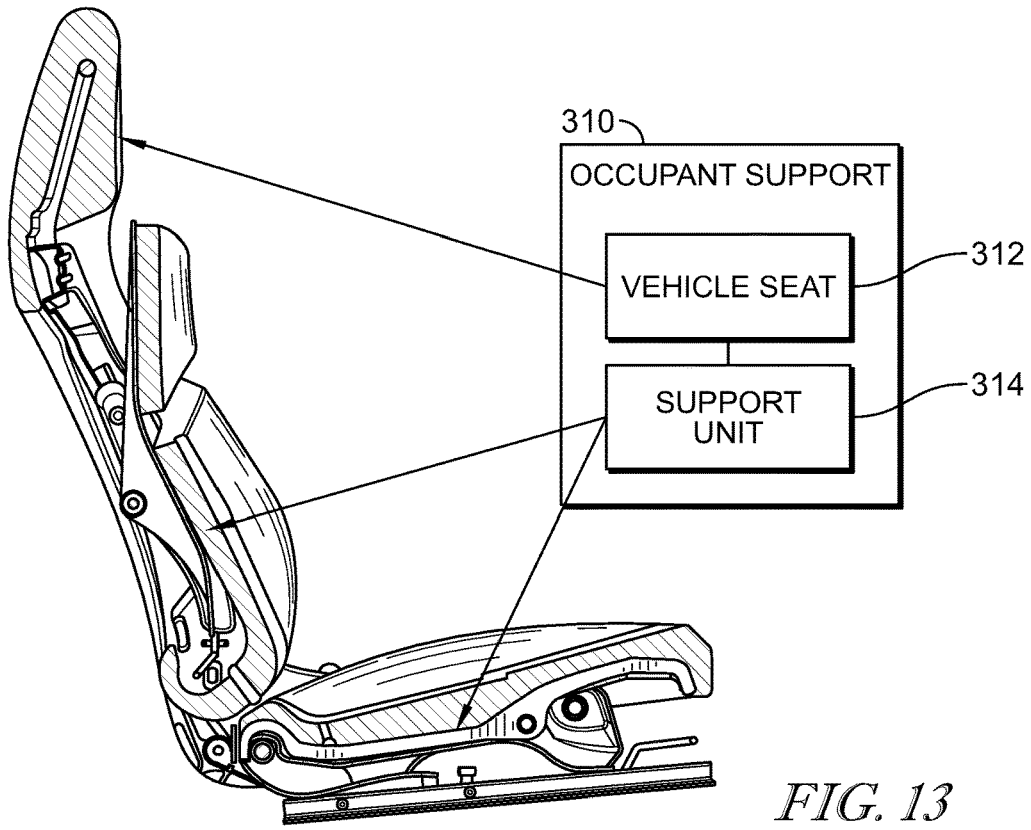
FIG. 13 is a sectional view of another occupant support, in accordance with the present disclosure, showing that the occupant support includes a vehicle seat having a seat bottom and a seat back and a support unit coupled to the vehicle seat for movement relative thereto, the support unit including a seat-back pan and a seat-bottom pan.

A fourth embodiment of an occupant support 310, in accordance with the present disclosure, includes a vehicle seat 312 and a support unit 314 as shown in FIG. 13. The vehicle seat 312 is coupled to a floor of a vehicle to provide support for an occupant 13 during operation of the vehicle. The support unit 314 is coupled to the vehicle seat 312 and is configured to move relative to the vehicle seat 312 as the occupant 13 adjusts their posture relative to the vehicle seat 312. The support unit 314 supports the occupant 13 at any and all postures between a fully compressed posture 15 as shown in FIG. 2 and a fully expanded posture 17 as shown in FIG. 3.

The vehicle seat 312 is similar to the vehicle seat 112. Accordingly, disclosure related to vehicle seat 112 is hereby incorporated in its entirety herein for vehicle seat 312.

The support unit 314 is similar to the support unit 114. Accordingly, disclosure related to support unit 114 is hereby incorporated in its entirety herein for support unit 314.

Figure 14:
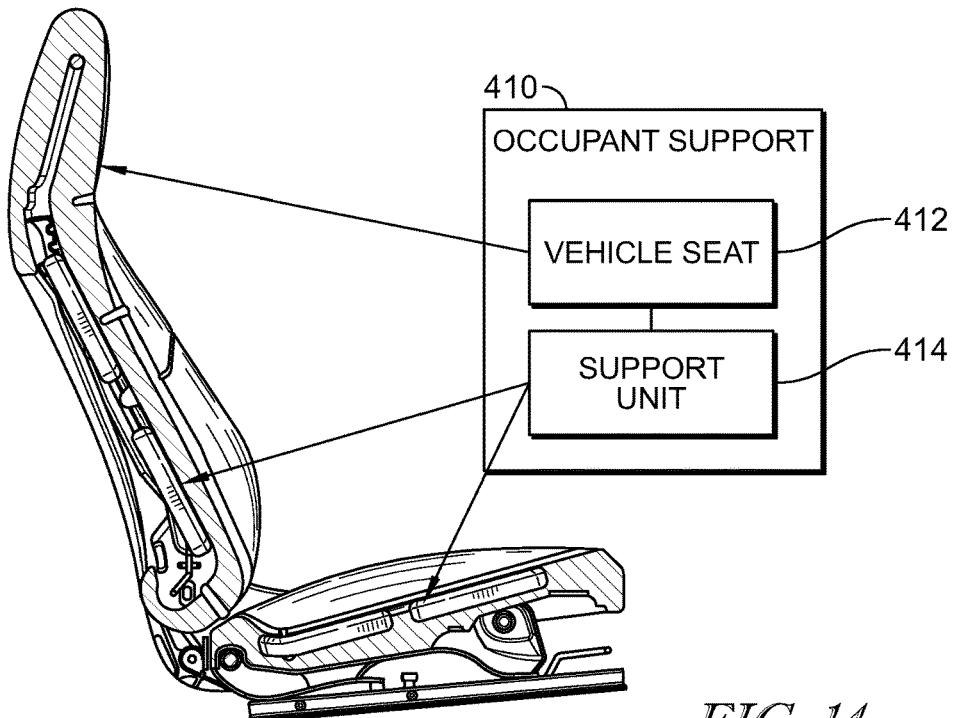
FIG. 14 is a sectional view of another occupant support, in accordance with the present disclosure, showing that the occupant support includes a vehicle seat having a seat bottom and a seat back and a support unit coupled to the vehicle seat for movement relative thereto, the support unit including a seat-back pneumatic system and a seat-bottom pneumatic system.

A fifth embodiment of an occupant support 410, in accordance with the present disclosure, includes a vehicle seat 412 and a support unit 414 as shown in FIG. 14. The vehicle seat 412 is coupled to a floor of a vehicle to provide support for an occupant 13 during operation of the vehicle. The support unit 414 is coupled to the vehicle seat 412 and is configured to move relative to the vehicle seat 412 as the occupant 13 adjusts their posture relative to the vehicle seat 412. The support unit 414 supports the occupant 13 at any and all postures between a fully compressed posture 15 as shown in FIG. 2 and a fully expanded posture 17 as shown in FIG. 3.

The vehicle seat 412 is similar to the vehicle seat 212. Accordingly, disclosure related to vehicle seat 212 is hereby incorporated in its entirety herein for vehicle seat 412.

The support unit 414 is similar to the support unit 214. Accordingly, disclosure related to support unit 214 is hereby incorporated in its entirety herein for support unit 414.

The plurality of bladders 228, 240 may include any suitable number of bladders and may include different arrangements to increase adaptability of the support unit 214 to the posture of the occupant. Some non-limiting examples of different arrangements of the plurality of bladders 228 are shown in FIGS. 15A-15G. Although FIGS. 15A-15G show that the plurality of bladders 228 may include those arrangements, bladders 240 may also include these arrangements. As such, the following disclosure for bladders 228 is incorporated herein in its entirety for bladders 240.

As shown in FIG. 15A, a first bladder arrangement 250 of the plurality of bladders 228 includes six bladders arranged in two rows of three bladders for each row. The bladders form a closed circuit such that each bladder is in fluid communication with one another. The bladders 228 are formed to include internal cavities. The internal cavities may be hollow and filled with fluid or the cavities may be filled with a foam material in addition to the fluid. In one example, the bladders are filled with a polyethylene terephthalate (PET) foam material with a relatively low density to minimize air travel speed between bladders in the closed loop. In another example, a PET foam material with a relatively high density is used. In another example, the bladders are filled with foam micro beads.

As shown in FIG. 15B, a second bladder arrangement 252 includes two bladders arranged to lie in top-bottom relation to one another. The bladders form a closed circuit such that each bladder is in fluid communication with the other bladder.

As shown in FIG. 15C, a third bladder arrangement 254 includes three bladders arranged to lie in top-bottom relation to one another. The bladders form a closed circuit such that each bladder is in fluid communication with one another. The bladders may be controlled with a valve 255.

As shown in FIG. 15D, a fourth bladder arrangement 256 includes two bladders arranged to lie in side-to-side relation to one another. The bladders form a closed circuit such that each bladder is in fluid communication with the other bladder.

As shown in FIG. 15E, a fifth bladder arrangement 258 includes a plurality of bladders arranged to lie in a physiological arrangement. The bladders form a closed circuit such that each bladder is in fluid communication with one another.

As shown in FIG. 15F a sixth bladder arrangement 260 includes a plurality of relatively small bladders. The bladders form a closed circuit such that each bladder is in fluid communication with one another.

As shown in FIG. 15G, a seventh bladder arrangement 264 includes first and second air bladders arranged to lie in side-to-side relation to one another and a lumbar bladder containing a foam material insert therein. The bladders form a closed circuit such that each bladder is in fluid communication with one another.

A sixth embodiment of an occupant support system 510, in accordance with the present disclosure, includes a vehicle seat 512 and a support unit 514 as shown in FIGS. 16-18. The vehicle seat 512 is coupled to a floor of a vehicle to provide support for an occupant 13 during operation of the vehicle. The support unit 514 is coupled to the vehicle seat 512 and is configured to move relative to the vehicle seat 512 as the occupant 13 adjusts their posture relative to the vehicle seat 512. The support unit 514 supports the occupant 13 at any and all postures between a fully compressed posture 15 as shown in FIG. 2 and a fully expanded posture 17 as shown in FIG. 3.

The vehicle seat 512 includes a seat frame 511, a seat bottom 518, and a seat back 520 as shown in FIG. 16. Seat frame 511 is coupled to a floor of the vehicle and is configured to secure the vehicle seat 512 to the vehicle. The seat frame 511 is arranged to lie in the seat bottom 518 and the seat back 520 to rigidify the vehicle seat 512. Seat bottom 518 is coupled to seat frame 511 and provides a base for the occupant to sit on while operating the vehicle. Seat back 520 is coupled to seat bottom 518 and the seat frame 511 and extends in an upward direction away from seat bottom 518. The seat bottom 518 and the seat back 520 each include a seat cushion 523 arranged to cover the seat frame 511 and a seat trim 525 arranged to cover the seat cushion 523.

The support unit 514 includes one or more vehicle seat adjusters in at least one of the seat bottom 518 and the seat back 520. In the illustrative embodiment, the support unit 514 includes a first plurality of bladders 522, a second plurality of bladders 524, and a seat-pivot pan 526 shown in FIG. 16. The first plurality of bladders 522 is arranged between a support plate 530 and the seat-pivot pan 526 as shown in FIGS. 17 and 18. The second plurality of bladders 524 is arranged to lie between the seat-pivot pan 526 and the seat trim 525. The seat-pivot pan is mounted to the vehicle seat for pivotable movement about a seat-pan pivot axis 526P as the occupant moves from the compressed posture 15 to the expanded posture 17.

The first plurality of bladders 522, the second plurality of bladders 524, and the seat-pivot pan 526 are configured to move automatically as the occupant 13 adjusts their posture relative to the vehicle seat 512 to support the occupant 13 on the vehicle seat 512 at any and all postures between the compressed posture 15 and the expanded posture 17. The first plurality of bladders 522, the second plurality of bladders 524, and the seat-pivot pan 526 cooperate with one another to emphasis the movement of the occupant as the occupant changes postures.

The invention claimed is:

1. An occupant support comprising
a vehicle seat including a seat bottom and a seat back, the vehicle seat configured to support an occupant thereon,
a support unit coupled to the vehicle seat and configured to move relative to the vehicle seat to support the occupant in one of a compressed posture, in which the occupants thoracic and lumbar regions of the spine are generally c-shaped, and an expanded posture, in which the occupants thoracic and lumbar regions of the spine are generally s-shaped, and
a motion-control unit configured to provide means for controlling movement of the support unit relative to the vehicle seat between the compressed posture and the expanded posture in response to a posture of the occupant to promote movement of the occupant as the occupant changes between the compressed posture and the expanded posture.

2. The occupant support of claim 1, wherein the support unit includes an upper back adjuster arranged to support the thoracic region of the spine and a lower back adjuster arranged to support the lumbar region of the spine and the upper and lower back adjusters are configured to move opposite one another such that the upper back adjuster retracts toward the vehicle seat and the lower back adjuster extends outwardly from the vehicle seat simultaneously with the retraction of the upper back adjuster as the occupant moves from the compressed posture to the expanded posture.

3. The occupant support of claim 2, wherein the lower back adjuster is configured to extend toward the vehicle seat in response to the occupant's lumbar region applying a force load on the lower back support and the upper back adjuster extends away from the vehicle seat as the lower back adjuster extends toward the vehicle seat to support the occupant in the compressed posture.

4. The occupant support of claim 1, wherein the support unit includes a bottom adjuster arranged in the seat bottom and configured to tilt upwardly as the occupant moves toward the compressed posture such that the occupant's thighs move toward the occupant's torso and the bottom adjuster is configured to tilt downwardly as the occupant moves toward the expanded posture such that the occupant's thighs move away from the occupant's torso.

5. The occupant support of claim 1, wherein the support unit includes a back adjuster arranged in the seat back and a bottom adjuster arranged in the seat bottom, the back adjuster including upper and lower back adjusters configured to move opposite one another such that the upper back adjuster retracts toward the vehicle seat and the lower back adjuster extends outwardly from the vehicle seat simultaneously with the retraction of the upper back adjuster as the occupant moves from the compressed posture to the expanded posture, the bottom adjuster is configured to tilt upwardly as the occupant moves toward the compressed posture such that the occupant's thighs move toward the occupant's torso and is configured to tilt downwardly as the occupant moves toward the expanded posture such that the occupant's thighs move away from the occupant's torso.

6. The occupant support of claim 5, wherein back adjuster and the bottom adjuster move toward the compressed configuration and the expanded configuration simultaneously.

7. An occupant support comprising
a vehicle seat including a seat bottom and a seat back, the vehicle seat arranged in a fixed position to support an occupant thereon, and
a support unit coupled to the vehicle seat and configured to move relative to the seat bottom and the seat back to support the occupant in one of a compressed posture, in which the occupants thoracic and lumbar regions of the spine define a generally c-shape, and an expanded posture, in which the occupant's thoracic and lumbar regions of the spine define a generally s-shape,
wherein the support unit is configured to move relative to the vehicle seat as the occupant moves between the compressed posture and the expanded posture to promote movement of the occupant relative to the vehicle seat between the compressed posture and the expanded posture while the vehicle seat is in a fixed position.

8. The occupant support of claim 7, wherein the occupant support further includes a motion-control unit configured to regulate movement of the support unit relative to the vehicle seat as the occupant moves between the compressed posture and the expanded posture while the vehicle seat remains fixed relative to the support unit.

9. The occupant support of claim 8, wherein the support unit includes a seat-back pivot pan mounted to the seat back for pivotable movement about a seat-back pivot pan axis and the seat-back pivot pan includes an upper portion arranged to lie above the seat-back pivot pan axis in communication with the thoracic region of the occupant and a lower portion arranged to lie below the seat-back pivot pan axis in communication with the lumbar region of the occupant, the upper and lower portions are configured to pivot about the pan axis and move opposite one another such that the upper portion retracts toward the vehicle seat and the lower portion extends outwardly from the vehicle seat simultaneously with the retraction of the upper portion as the occupant moves from the compressed posture to the expanded posture.

10. The occupant support of claim 9, wherein support unit further includes a seat-bottom pivot pan mounted to the seat bottom for pivotable movement about a seat-bottom pivot pan axis and the seat-bottom pivot pan is configured to tilt upwardly as the occupant moves toward the compressed posture such that the occupant's thighs to move toward the occupant's torso and the seat-bottom pivot pan is configured to tilt downwardly as the occupant moves toward the expanded posture such that the occupant's thighs to move away from the occupant's torso.

11. The occupant support of claim 10, wherein the motion-control unit includes a first tension adjustment system coupled to the seat-back pivot pan and a second tension adjustment system coupled to the bottom adjuster pan, the first and second tension adjustment systems are configured to regulate movement of the seat-back pivot pan and the seat-bottom pivot pan as the occupant moves between the compressed posture and the expanded posture.

12. The occupant support of claim 8, wherein the support unit includes a pneumatic seat-back pad arranged to lie in the seat back, the seat-back pad having a first bladder arranged to lie in communication with the thoracic region of the occupant and a second bladder arranged to lie in communication with the lumbar region of the occupant, the first and second bladders coupled in fluid communication to one another to form a closed circuit such that the first bladder deflates toward the vehicle seat to cause the second bladder to inflate outwardly from the vehicle seat simultaneously with the deflation of the first bladder as the occupant moves from the compressed posture to the expanded posture.

13. The occupant support of claim 12, wherein the support unit includes a seat-bottom pad arranged to lie in the seat bottom, the seat-bottom pad having a third bladder arranged to lie in communication with the upper-thigh region of the occupant and a fourth bladder arranged to lie in communication with the lower-thigh region of the occupant, the third and fourth bladders coupled in fluid communication with one another to form a closed circuit such that the third bladder deflates toward the vehicle seat to cause the fourth bladder to inflate outwardly from the vehicle seat simultaneously with the deflation of the third bladder as the occupant moves from the compressed posture to the expanded posture.

14. The occupant support of claim 13, wherein the motion-control unit includes a pump system configured to inflate the bladders to move the occupant between the compressed posture and the expanded posture and a manifold configured to deflate the bladders.

15. The occupant support of claim 7, wherein the support unit includes a first seat-back pad having a first plurality of pneumatic bladders, a second seat-back pad having a second plurality of bladders, and a seat-back pivot pan arranged to lie between the first and second seat-back pads, the first plurality of bladders coupled to one another to form a closed loop, the second plurality of bladders coupled to one another to form a closed loop, and the seat-back pivot pan mounted to the seat back for pivotable movement about a seat-back pivot pan axis.

16. The occupant support of claim 15, wherein the support unit further includes a first seat-bottom pad having a first plurality of pneumatic bladders, a second seat-bottom pad having a second plurality of bladders, and a seat-bottom pivot pan arranged to lie between the first and second seat-bottom pads, the first plurality of bladders coupled to one another to form a closed loop, the second plurality of bladders coupled to one another to form a closed loop, and the seat-bottom pivot pan mounted to the seat bottom for pivotable movement about a seat-bottom pivot pan axis.

17. The occupant support of claim 7, wherein the support unit includes an upper back adjuster arranged to support the thoracic region of the spine and a lower back adjuster arranged to support the lumbar region of the spine and the upper and lower back adjusters are configured to move opposite one another such that the upper back adjuster retracts toward the vehicle seat and the lower back adjuster extends outwardly from the vehicle seat simultaneously with the retraction of the upper back adjuster as the occupant moves from the compressed posture to the expanded posture.

18. The occupant support of claim 17, wherein the support unit further includes a bottom adjuster arranged in the seat bottom, the bottom adjuster is configured to tilt upwardly as the occupant moves toward the compressed posture such that the occupant's thighs to move toward the occupant's torso and is configured to tilt downwardly as the occupant moves toward the expanded posture such that the occupant's thighs to move away from the occupant's torso.

19. The occupant support of claim 18, wherein the motion-control unit includes a sensor system arranged to lie in at least one of the seat bottom and the seat back and a control system configured to determine a pressure distribution of the occupant and command the support unit to adjust relative to the vehicle seat based on the occupant's pressure distribution on the vehicle seat.

20. The occupant support of claim 19, wherein the sensor system includes a first sensor arranged to lie in communication with the lumbar region of the occupant and a second sensor arranged to lie in communication with the upper thigh region of the occupant, the first and second sensors are configured to send signals to the control system associated with the pressure distribution of the occupant on the vehicle seat.

21. The occupant support of claim 20, wherein the control system includes a controller, a processor, and memory, the processor receives the signal from the sensor system and determines the pressure distribution of the occupant based on a posture of the occupant and the processor sends an input signal to the controller to command the support unit to move and support the occupant in said posture.

* * * * *